United States Patent [19]

Hall et al.

[11] Patent Number: 5,661,778

[45] Date of Patent: *Aug. 26, 1997

[54] PERFORMANCE MONITORING OF DS0 CHANNEL VIA D4 CHANNEL BANK

[75] Inventors: Clifford L. Hall, Huntsville; Norman R. Harris, Madison; Stephen T. Killian, Huntsville; Jeffrey B. Wells, Madison, all of Ala.

[73] Assignee: Adtran, Inc., Huntsville, Ala.

[*] Notice: The term of this patent shall not extend beyond the expiration date of Pat. No. 5,473,665.

[21] Appl. No.: 528,139

[22] Filed: Sep. 14, 1995

Related U.S. Application Data

[63] Continuation of Ser. No. 27,948, Mar. 8, 1993, Pat. No. 5,473,665.

[51] Int. Cl.⁶ .................................................. H04M 3/30
[52] U.S. Cl. ................................................ 379/29; 379/22
[58] Field of Search ................................. 375/224, 225, 375/227; 370/15, 241, 247, 249, 251; 379/5, 27, 29, 9, 12, 22

[56] References Cited

U.S. PATENT DOCUMENTS

| | | | |
|---|---|---|---|
| 4,641,299 | 2/1987 | Kemper et al. | 370/15 |
| 4,736,402 | 4/1988 | Landis | 375/224 |
| 4,949,355 | 8/1990 | Dyke et al. | 375/224 |
| 5,018,184 | 5/1991 | Abrams et al. | 370/15 |
| 5,054,050 | 10/1991 | Burke et al. | 379/29 |
| 5,140,625 | 8/1992 | Reum et al. | 375/224 |
| 5,208,803 | 5/1993 | Conforti et al. | 379/29 |
| 5,301,050 | 4/1994 | Czerwiec et al. | 379/29 |

*Primary Examiner*—Wellington Chin
*Assistant Examiner*—Jean B. Corrielus
*Attorney, Agent, or Firm*—Charles E. Wands

[57] ABSTRACT

Non-intrusive performance monitoring of a DS0 channel between a customer premises interface and a D4 channel bank includes an augmentation of existing channel bank equipment and a digital services communication device terminating the DS0 link at the customer site. An auxiliary signalling and performance monitoring arrangement is remotely accessible by a non-resident control site, for example by way of an RS-232 port of a line interface unit of the channel bank, thereby enabling the control site to perform prescribed network supervisory tasks with respect to one or more selected DS0 links, including provisioning of their associated loop equipment and performance monitoring of each DS0 loop. Office channel unit data port and line interface components of the channel bank are modified to provide bidirectional signalling capability via the receive segment of the channel bank's internal communications link. The signalling format on the bidirectional signalling link is defined so as to support both the transmission of incoming (received DS1) signalling traffic from the line interface unit to an office channel unit, and the bidirectional exchange of performance-monitoring command and response messages. A performance monitoring arrangement, installed in the channel unit and the digital communications network interface, monitors at least one prescribed performance aspect of the DS0 channel and forwards performance signals to the line interface unit over the bidirectional signalling link.

30 Claims, 15 Drawing Sheets

PERFORMANCE MONITORING OF DS0 CHANNEL VIA D4 CHANNEL BANK

This is a continuation of application Ser. No. 08/027,948, filed Mar. 8, 1993, now U.S. Pat. No. 5,473,665, issued Dec. 5, 1995.

FIELD OF THE INVENTION

The present invention relates in general to telephone communication systems, and is particularly directed to a mechanism for monitoring the performance of a digital communications (DS0) channel between a customer premises interface and a D4 channel bank, by means of a non-intrusive supervisory communications link that is installed in an existing (D4) channel bank, the supervisory communications link being accessible by a local or remote control site (e.g. using an auxiliary RS 232 port), thereby enabling the control site to perform prescribed network supervisory tasks with respect to one or more selected DS0 links, including performance monitoring of each DS0 loop.

BACKGROUND OF THE INVENTION

Although the proliferation of digital communications equipment has met with widespread acceptance in a variety of industries, telephone companies have been slow to convert to or integrate digital signalling subsystems and communication schemes into their well established copper wire networks. One of the principal reasons for such reticence is the fact that a significant part, if not all, of an established telephone network employs analog signalling equipment. Still, because of substantial user demand, regional Bell operating companies (RBOC's) currently provide leased-line digital services to sophisticated customers, who maintain their (digital) communications networks with intelligent management systems that provide detailed information regarding the quality of the service being delivered. This information provides the customer with the ability to develop long term statistics for error-free seconds, severely errored seconds, as well as channel availability—i.e. quantitative measures of the quality of service being leased to the customer.

Unfortunately, the network topographies and operating schemes currently embedded in the RBOC's networks do not provide adequate information about the performance of the (digital) service access metallic loops between the serving central office and the network interface at the customer's premises. As a consequence, an RBOC is not readily prepared to deal with a customer who, based upon the customer's own analysis of the data traffic, alleges that the published digital services specifications are not being fulfilled. In addition, the local telephone company also lacks the information needed to observe the success of its own objectives toward delivering the services and means to rapidly detect and respond to degradation or outage in service.

Because of these recognized shortcomings, the RBOC's (and the Telco's in general) are seeking to upgrade the diagnostic tools currently employed for their digital carrier links to schemes that will provide them with the ability to monitor the performance of their metallic loops. Although complete system replacement is one straightforward approach, the service providers generally prefer add-ons or enhancements to already installed systems, in order to allow the bulk of the existing equipment to be preserved and to minimize service interruption when upgrading the network.

SUMMARY OF THE INVENTION

In accordance with the present invention, the above described desire of telecommunications services providers to equip existing equipment with the ability to monitor the performance of a digital communications (DS0) channel between a customer premises interface and a D4 channel bank is successfully addressed by a modification of channel bank and DS0 link-terminating digital services communication device components, so as to provide a performance monitoring scheme that is transparent to digital services subscribers while, at the same time, being readily accessible a supervisory control site, thereby enabling the control site to perform prescribed network supervisory tasks with respect to one or more selected DS0 links, including performance monitoring of each DS0 loop.

The auxiliary signalling and performance monitoring arrangement according to the present invention may be accessed by a remote or local control site, for example by way of an RS-232 port of a line interface unit of the channel bank. Office channel unit data port and line interface components of the channel bank are modified to provide bidirectional signalling capability via the receive segment of the channel bank's internal communications link. The signalling format on the bidirectional signalling link is defined to support both the transmission of incoming (received DS1) signalling traffic from the line interface unit to an office channel unit, and the bidirectional exchange of performance-monitoring command and response messages.

A performance monitoring arrangement, installed in a channel unit and a digital data services network termination (DDST) serving the customer's premises, monitors at least one prescribed performance aspect of the DS0 channel in each of the channel unit-to-DDST direction, and the DDST-to-channel unit direction, and forwards DS0 channel quality-representative messages to the line interface unit over the bidirectional signalling link.

In order to provide bidirectional signalling capability via the receive segment of the channel bank's internal communications link, the signalling format on the bidirectional signalling link is defined so as to support both time division interleaving of incoming (received DS1) signalling traffic from the line interface unit to an office channel unit, and the bidirectional exchange of DS0 channel-representative performance-monitoring command and response messages. The bidirectional link is controllably tri-stated in a time division-multiplexed manner, such that command message components may be interleaved with normal received (DS1) signalling traffic in the line interface-to-channel unit direction, and response message components (relating to a measured performance of the DS0 channel) from a channel unit to the line interface unit may be interleaved with information bits contained within incoming DS1 signalling traffic received from the line interface unit.

Within the channel unit of said D4 bank, one or more prescribed performance aspects of the DS0 loop are monitored, and information representative of each monitored performance aspect is stored. In response to a command message from the line interface unit, a reply message containing stored DS0 channel performance information is assembled and clocked onto the bidirectional communications link, so that it may be captured by the line interface unit and reported to a supervisory control unit external to the channel bank.

In order to accommodate interleaving of normal data traffic and command message components at a signalling rate synchronized with the recovered DS1 clock, each of the line interface unit and the channel bank interface portion of an office channel unit data port is modified to incorporate tri-stated multiplexer units which control time division multiplexing of data traffic and command/response messages on the bidirectional bus, such that there is no overlap of data traffic bits and interleaved command/response message bits, hereinafter termed c-bits.

In a preferred embodiment of the invention, command messages from the line interface unit to a destination channel unit and response messages from an interrogated channel unit are asserted onto the bidirectional line during portions of the recovered clock that are referenced to with the falling edge of the recovered clock. Normal received DS1 data traffic, on the other hand, is active on the bus during portions of the recovered clock that are referenced to the rising edge of the recovered clock.

The loop interface portion of a channel unit is modified to incorporate additional multiplexing circuitry through which the functionality of the loop interface portion of the OCU-DP is enhanced to provide DS0 loop performance-monitoring capability. This additional capability is provided by the insertion of framing and error detection (for example, checksum or CRC) sequences into the DS0 data stream to the downstream DDST and by monitoring the incoming DS0 data from the DDST end of the loop.

More particularly, at the DS0 channel or DDST side of the loop interface, a multiplexer is coupled to receive, in addition to the DS0 data stream intended for the customer's digital signalling equipment, a framing pattern and an error detection sequence that are generated in accordance with the bit contents of the DS0 data stream that has been down-converted from the incoming DS1 data stream received over the above-referenced bidirectional communication link from the line interface unit. A further input port of the multiplexer is coupled to an attendant channel unit microcontroller to receive processor-based supervisory message data signals that are to be incorporated as part of the overhead signalling to the DDST at the customer's premises. The channel unit microcontroller reads command messages from the line interface unit, monitors performance indicators on the return portion of the DS0 loop from the DDST, and sources reply messages, which are interleaved with outgoing DS1 traffic on the bidirectional link to the line interface unit. It also assembles and injects messages performance monitoring request messages into the DS0 data stream to the DDST, so as to control the operation of the performance monitoring circuitry of the DDST.

The select input of the channel unit's multiplexer is controllable by a frame generator which defines the composition of the DS0 data frame to be forwarded to the DDST. The framing generator sequentially varies the throughput path of the multiplexer so as to selectively assemble the DS0 data, and overhead/control information in the form of the error detection sequence and supervisory message bits into a composite DS0-data rate signal. This composite DS0-data rate bit stream is conveyed over a downstream-directed tip/ring pair of the four wire metallic link to a digital data services network termination (DDST) serving the customer's premises.

The configuration of the DDST is augmented with the capability of extracting the overhead/control information that has been inserted into the DS0 signalling path by the OCU-DP, so that a measure of the performance of the channel unit-to-DDST portion of the metallic loop may be obtained at the loop termination equipment. Performance monitoring information inserted at the OCU-DP line interface is extracted by way of a demultiplexer, the input of which is decoded by an alternate mark inversion (AMI) decoder and respective outputs of which are coupled to a frame recovery unit, error detection circuitry, and a signal path to the customer equipment. The frame recovery unit extracts the framing overhead information and controls the throughput of the demultiplexer. The error detection circuitry compares the operation of a resident error detection sequence generator on the demultiplexed DS0 data with the embedded error detection bits that were inserted at the channel unit, in order to provide a measure of the performance of the channel unit-to-DDST portion of the loop. This performance data is stored so that it may be controllably injected into the return portion of the loop in response to a request message multiplexed with the downstream-directed DS0 bits in the channel unit. The DS0 signal output port of the demultiplexer is re-encoded by an AMI encoder, which restores the DS0 signal to its original format. The DS0 signal is then filtered and converted to bipolar format for application to outgoing tip and ring leads to a data service unit/channel service unit located at the customer's premises.

For the DS0 channel on the return (DDST-to-channel unit) portion of the four wire metallic pair, the digital data services network termination configuration is modified in a manner similar to the channel unit, to provide for the insertion of framing and error detection sequences into the customer-sourced DS0 data stream. For this purpose, bipolar signals from the tip and ring leads of the transmit portion of the link from the data service unit/channel service unit (CSU/DSU) located at the customer's premises are decoded by an AMI decoder. In a conventional network termination, where there is no performance signalling, the signal path is coupled directly to the loop output port of the DDST. For performance monitoring signalling the incoming DS0 data is coupled to an AMI decoder for DDST multiplex processing. The output of the AMI decoder is coupled as an input to a DS0 data stream multiplexer. The select input of the multiplexer is controlled by a framing generator, which is operative to format an upstream-directed DS0 data stream, which contains microcontroller supplied message data, such as information relating to the measured performance of the downstream DS0 channel as described above, the AMI decoded customer-sourced data, and an error detection sequence into a composite DS0 message pattern. The output of the multiplexer is encoded in an AMI encoder and the encoded signal is converted to bipolar format and applied to the tip and ring pair of the transmit path of the metallic loop to the OCU-DP line interface.

On the return path within the OCU-DP line interface, respective components of the customer-sourced data stream are extracted by way of a demultiplexer, the throughput of which is controlled by a frame recovery unit which derives framing overhead information from the composite DS0 data stream. Error detection circuitry compares the operation of a resident error detection sequence generator on the demultiplexed DS0 data with the embedded error detection bits that were inserted in the DDST, so as to provide a measure of the performance of the ddst-TO-channel unit portion of the loop. The DS0 signal output port of the demultiplexer is applied to a DS0-DS1 rate converter and applied over the transmit data path to the channel bank's line interface unit. An additional performance measure is derived by way of a receive signal quality monitor unit which is coupled to an AMI decoder and a code converter. This unit monitors whether any code violation in the signal sequence applied to the AMI decoder has occurred, and whether a detected violation is legal or illegal. The determination is reported as a receive signal quality indication to the channel unit's microcontroller. Performance data is stored in attendant memory, so that it may be controllably accessed by a supervisory control unit and assembled as part of a performance-reporting response message, that is multiplexed on the line interface unit-channel unit bidirectional communication link with incoming DS1 signals received from the line interface unit, as described above.

DETAILED DESCRIPTION

Figure 1:
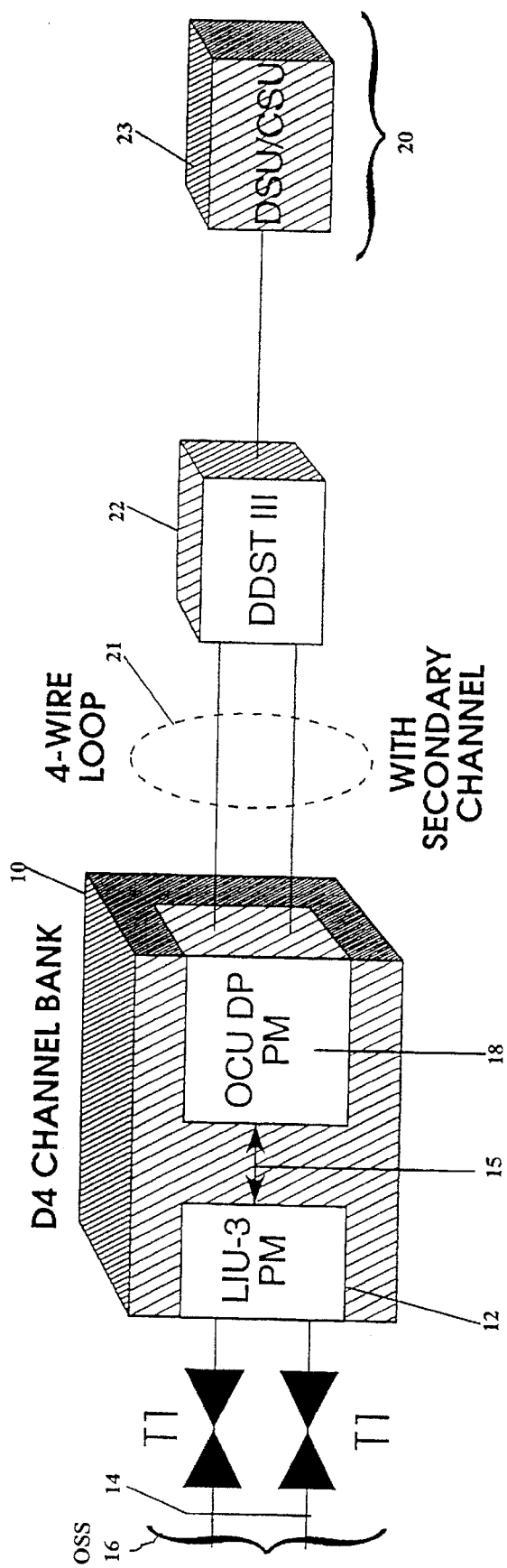
FIG. 1 diagrammatically illustrates a D4 channel bank employed in a digital carrier telephone network through which digital services are provided by the network to digital signalling equipment located at a customer's premises.

Before describing in detail the new and improved DS0 channel performance monitoring mechanism in accordance with the present invention, it should be observed that the invention resides primarily in the modification of conventional channel bank and digital data service components, together with an augmentation of the communications control software currently employed in a D4 channel bank, so as to permit a supervisory performance monitoring controller to selectively establish a control link with and exchange DS0 loop-performance command and response messages with DS0 channel units on selective basis. The details of the circuitry of the line interface and channel units are otherwise essentially unaffected. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
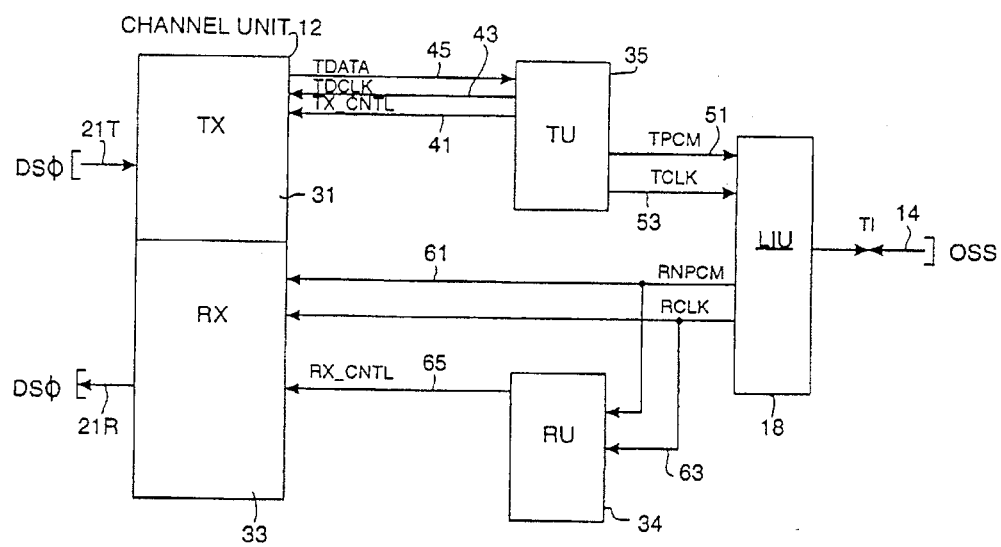
FIG. 2 diagrammatically illustrates the configuration of a standard AT&T-compatible D4 channel bank.

FIG. 1 diagrammatically illustrates a digital carrier terminal 10 (a D4 channel bank, a general block diagram of which is shown in FIG. 2, to be described) of a representative digital carrier telephone network through which digital services are provided by the network to digital signalling equipment located at a customer's premises 20. Digital carrier terminal 10 typically contains a line interface unit (LIU) 12 which interfaces one end of a T1 (1.544 Mb/s) carrier digital communications link 14. A second end of T1 link 14 may be connected to another office containing an operational support system (OSS) 16 located remotely with respect to terminal 10. D4 channel bank 10 also includes an office channel unit data port (OCU-DP) 18, which is coupled to LIU 12 via an intra bank PCM communications link 15, and interfaces bipolar signals carried by a local (DS0) loop (e.g. a four-wire metallic link) 21 to (via receive link portion 21R), and from (via transmit link portion 21T) a digital data service termination (DDST) 22 which terminates the metallic loop 21 with a data service unit/channel service unit (CSU/DSU) 23 located at the customer's premises 20. The LIU 12 and OCU-DP 18 within the D4 channel bank 10 include respective transmit/receive buffers associated with the respective (bipolar/DS1/DS0) ports of that unit. These buffers are controlled by a resident microcontroller for interfacing DS1-formatted data traffic from the line (T1 link 14) side of the terminal, retiming the traffic as a bipolar data stream for transmission as a DS0 data stream from the D4 channel bank 10 to the customer's DSU/CSU site 20, and reconverting bipolar signals, supplied from the customer site 20 to OCU data port 18, into DS1 data frames for transmission over T1 link 14.

In accordance with the present invention, each of line interface unit (LIU) 12 and office channel unit data port (OCU-DP) 18 is modified to incorporate additional circuitry and communication capability in order to provide, within the D4 channel bank, an embedded bidirectional communication mechanism that allows the performance of the metallic loop 21 to be monitored, and then reported to a local or remote supervisory control unit, for example via an RS 232 data port. Loop-terminating DDST 22 is also modified to measure loop performance and communicate performance information to the OCU-DP 18, where it is stored. This performance information may be externally accessed by means of a command message supplied from LIU 12 to the OCU-DP 18 via the intra-bank bidirectional communications link, thereby enabling a control site, such as OSS 16, to perform prescribed network supervisory tasks with respect to one or more channel units.

Referring now to FIG. 2, the configuration of a standard AT&T compatible D4 channel bank, such as that manufactured by Adtran Corporation, Huntsville, Ala., is diagrammatically illustrated as comprising an office channel unit data port (OCU-DP) 12, containing a transmitter section 31, to which DS0 data from the four wire metallic loop 21 is supplied from the customer site termination equipment, and a receiver section 33, from which DS0 data is coupled to four wire metallic loop 21 for delivery to the customer site termination equipment. The D4 channel bank also includes a receive unit 34 and transmit unit 35.

Transmit unit 35 supplies transmission control TX-CNTL signals via a transmission control, link 41 that contains a set of transmit sequence control leads for controlling the format of the transmissions, and a transmit clock TD-CLK via a transmit clock link 43 to transmitter section 31 of each channel unit 12. In response to these signals, the channel unit decodes its respective channel select strobe and transmits data onto a transmit data TDATA bus 45 in a respective one of a plurality (e.g. 24) multiplexed channel unit time slots of a multi-channel (e.g. 24 channel) unit digroup within the D4 bank. In accordance with AT&T defined communication standards, the channel select strobe occurs at an 8 KHz rate and the transmission of eight bits per strobe corresponds to one 64 Kb/s (DS0) channel for a DS1 line. Transmit unit 35 collects 192 bits (8 bits from each of the (24) channel units) from transmission data bus 45, appends a framing bit, and outputs the resulting DS1-formatted PCM data stream onto TPCM link 51, and an associated transmit clock signal via TCLK link 53 to line interface unit 18.

Although not illustrated in FIG. 2, an additional link may be provided for allowing analog channel units to deliver pulse amplitude modulated samples of analog signals to be coupled to transmit unit 35 for subsequent conversion to PCM data bytes and insertion into the appropriate channel unit time slot of TPCM link 51. 'A' and 'B' signalling bits are also coupled to transmit unit 35 from an analog channel unit for insertion into the LSB position of the data byte of frame six ('A' bit), and frame twelve ('B' bit) of the superframe. As will be described below with reference to FIG. 4, line interface unit 18 may convert the superframe framing format provided by transmit unit 35 to DS1 extended superframe format. The line interface unit 18 then couples the formatted DS1 data onto the digital carrier for transmission over T1 link 14.

Incoming T1 carrier signals from T1 link 14 are received by line interface unit 18, and extended superframe format is converted into superframe formatted signals, as necessary. Payload or signalling bits are not altered. The DS1 data is output to a receive PCM link 61 and coupled to receive unit 34 and receiver section 33 of OCU-DP 12. The DS1 clock is recovered by LIU 18 and the recovered clock RCLK is coupled over receive clock RCLK link 63 to each of receive unit 34 and receiver section 33 of OCU-DP 12.

Receive unit 34 synchronizes its timing with the DS1 framing pattern of the received signal and supplies channel unit control signals over link 65 to receiver section 33, so as to allow each channel unit to decode its channel select strobe for the received data and to extract its corresponding byte of data from the associated time slot of data link 61. This data strobe timing is diagrammatically illustrated in FIG. 3, which shows sequential information (I) bits (eight bits per channel i) being asserted onto receive data RNPCM link 61 coincident with falling edges of sequential RCLK signals, thereby allowing for a one-half bit time of set-up and one-half bit time of hold. Again, in the receive direction, although not illustrated in FIG. 2, there is an additional analog signalling link which may be provided to allow analog channel units to deliver PAM samples of analog signals (converted from PCM bytes) to be coupled from receive unit 34 to the appropriate analog channel unit. Control link 65 contains a set of sequence control leads that are employed to control receive signalling format, including the contents of frames six and twelve of a superframe. The receiver section 33 of the channel unit recovers the appropriate 'A' or 'B' signalling bit during the appropriate frame when the channel select strobe is active.

It should be noted that in the D4 channel bank configuration of FIG. 2, all channel units in the D4 channel bank share the transmit and receive data links 45 and 61, respectively, so that each channel unit has physical access to every DS0 time slot in a digroup. However, time slot allotment is multiplexed under control of control and clock signals supplied by the transmit unit 35 for the transmit direction and by the receive unit 34 for the receive direction.

As described briefly above, the DS0 performance monitoring scheme of the present invention is implemented by modifying the communication circuitry within each of the OCU-DP and the LIU of the D4 channel bank, so as to provide a non-intrusive supervisory communications link that is remotely accessible by a non-resident control site, such as OSS 16 via the T1 carrier link, or a monitoring computer coupled to an RS-232 port, etc. Pursuant to the invention, the circuitry of each of office channel unit data port 12 and the line interface unit 18 within the channel bank is upgraded in the manner described in detail below, so as to enable the receive RNPCM data link 61 to provide bidirectional signalling capability between the LIU 18 (which serves as a centralized controller of all channel units within the D4 channel bank) and each OCU-DP 12.

In particular, the circuitry of the line interface unit 18 is modified so that command messages may be transported via intra bank RNPCM data link 61 to selected ones of the (48) channel units of the two digroups within the bank, and so that provisioning and performance monitoring (PM) information may be delivered back to the line interface unit from one or more interrogated channel units without corrupting the normal received data traffic on the RNPCM link.

Figure 4:
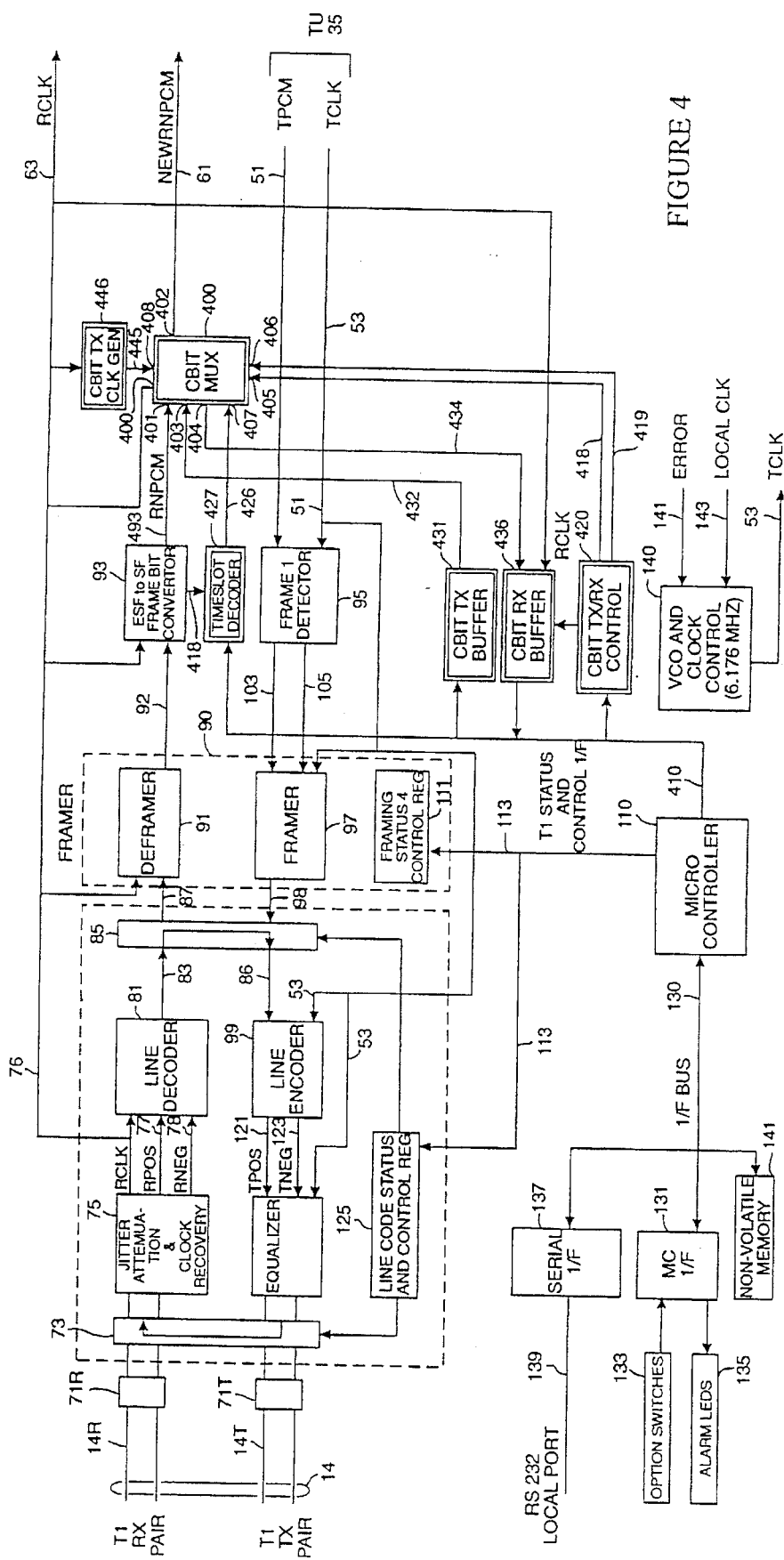
FIG. 4 diagrammatically illustrates the manner in which a line interface unit of a conventional AT&T-compatible D4 channel bank may be modified in accordance with the present invention in order to equip the line interface unit with the ability to operate as a centralized performance monitoring controller.

FIG. 4 diagrammatically illustrates the manner in which a line interface unit 18 of a conventional AT&T compatible D4 channel bank may be modified in accordance with the present invention in order to equip the LIU with the ability to operate as a centralized performance monitoring controller. Namely, as will be described, an enhanced performance monitoring (PM) line interface unit includes the same signalling, timing and control components as a conventional line interface unit, plus additional circuitry which effectively converts a conventional LIU into a performance-monitoring LIU. In FIG. 4, the components of a conventional LIU are designated by single lines, while the upgrading circuit components of the present invention are shown in double lines and are identified by three digit reference numerals which begin with the prefix '4'. In order to facilitate an understanding of the enhancement provided in accordance with the present invention, the configuration and operation of the LIU of a conventional D4 channel bank will be briefly reviewed, followed by a description of the additional circuitry which provides the LIU with performance-monitoring capability. It should also be noted the details of the communication circuitry shown in the upper portion of FIG. 4 and surrounded by lines 100 corresponds to one-half of a digroup within the LIU; the other half of the digroup has been omitted from the Figure in order to simplify the drawing. Each digroup shares the same external signalling interface and supervisory control circuitry shown as being surrounded by lines 101.

The T1 carrier link 14 includes a receive pair portion 14R and a transmit pair portion 14T, which are respectively coupled, via transformers 71T and 71R, to a controlled loopback relay interface 73. Incoming T1 receiver pair 14R supplies bipolar non-return to zero (NRZ) signals, which are coupled through loopback interface 73 to a jitter attenuator and clock recovery unit 75. Clock recovery unit 75 recovers the receive clock RCLK from the incoming T1 carrier signal and outputs the recovered clock signal RCLK over link 76 to downstream signal processing circuitry, to be described. In addition, clock recovery unit 75 outputs respective RPOS and RNEG (bipolar TTL-CMOS level) signals on links 77 and 78 to a line decoder 81. (RPOS goes active high for a positive one on the T1 line, and RNEG is active high for a negative one on the T1 line.)

Line decoder 81 decodes the contents of RPOS and RNEG links 77 and 78, respectively and recovers either an alternate mark inversion format (AMI) or bipolar B8ZS (bipolar eight zero substitution) format and delivers the decoded serialized data stream over line 83 through a further loopback relay interface 85 and therefrom over link 87 to a deframer 91 of a framing/deframing unit 90.

Deframer 91 synchronizes the framing pattern (superframe SF or extended superframe ESF) with the recovered clock RCLK and, via its embedded status and control capability, analyzes the decoded data stream with respect to prescribed status indicators, such as whether the data contains extensive frame bit errors, whether an excessive number of zeros have been received, whether a yellow alarm is active, whether there are excessive bipolar violation errors, whether a loss of carrier (too many consecutive zeros) has been detected, and the presence of a blue alarm (an unframed all one's pattern). The serial synchronized data stream is then coupled via link 92 to an extended superframe (ESF) to superframe (SF) converter 93, which is active to convert the frame format to SF, only if the data format is ESF, with one ESF becoming two SFs. Otherwise, ESF-to-SF converter passes the data 'as is' to RNPCM link 61 for application (in an inverted format) to the receive section 33 of channel unit 12. (It may be noted that the D4 channel bank receive unit 34 normally accepts only SF formatted data.)

Figure 3:
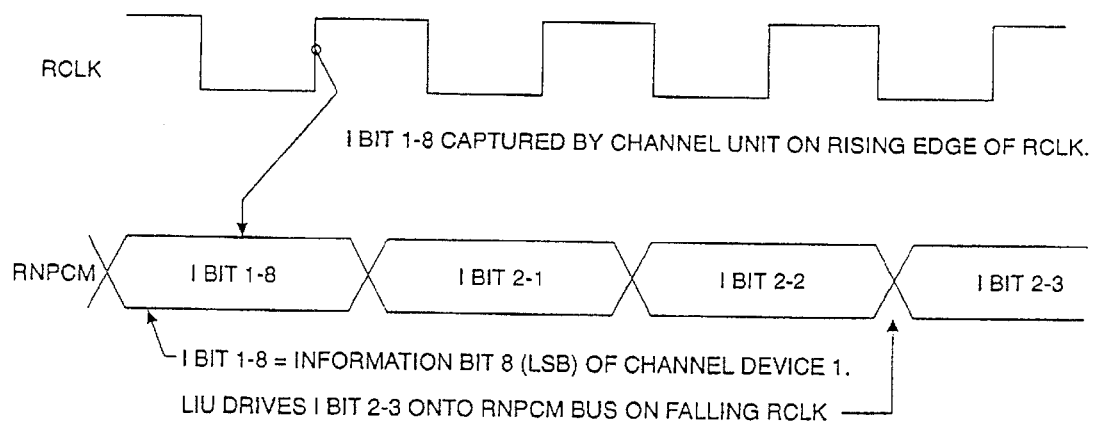
FIG. 3 is a timing diagram showing sequential information bits asserted onto a receive data link coincident with falling edges of sequential RCLK signals.

As pointed out previously, information bits of a recovered DS1 data stream are customarily asserted on RNPCM line 61 from the output of ESF-to-SF frame converter 93 on the falling edge of the recovered clock signal RCLK, as shown in the timing diagram of FIG. 3. However, as will be described in detail below, rather than directly connect line 61 to the output of ESF-to-SF frame converter 93, so that successively produced information bits would be directly clocked out onto RNPCM line 61, in accordance with the present invention, each end of line 61 is terminated by way of a controllably tri-stated multiplexer (mux), one of which is shown in FIG. 4 as a control or 'c-bit' multiplexer 400 (a detailed configuration of which is presented in FIG. 5, to be described) which allows line 61 to be employed as a bidirectional communication link between the LIU and the channel units. As will be explained, the time division multiplex format of this bidirectional signalling capability of line 61 is such that, during one or more timeslots associated with one or more destination channel units, outgoing information bits (I) from the LIU may be controllably multiplexed with additional control or c-bits that make up a command message intended for the one or more destination channel units. In addition, during time slots where data is not being transmitted, line 61 is provisioned to transmit response messages from one or more channel units back to the LIU. Before detailing this additional bidirectional communication capability, the remaining components of the LIU portion of a conventional D4 channel bank illustrated in FIG. 4 and employed for DS1 transmit direction signalling will be described.

Respective transmit data TPCM and transmit clock TCLK lines 51 and 53 are coupled from the transmit unit 35 to a 'Frame 1' detector 95. Transmit clock line 53 is further coupled to a framer 97, a line encoder 99, and an equalizer 101. Transmit data is asserted on the transmit data line in synchronization with the rising edge of a transmit clock TCLK. Frame 1 detector 95 analyzes the TPCM data on line 51 to determine when the first bit of the first frame of the superframe occurs. The data is coupled over line 103 and a multi-frame control signal is coupled over line 105 to framer 97 within framing/deframing unit 90. The multi-frame control signal on line 105 is aligned with the first bit (bit 1) of frame one of the superframe (SF). Framer 97 uses this multi-frame control signal to determine how to overwrite the SF framing bit with the ESF framing bit in accordance with control data supplied by way of a framing status and control register 111 that has been loaded by a supervisory microcontroller 110 via a control link 113. Register 111 of framing/deframing unit 90 is used by microcontroller 110 place framer 97 in a superframe or extended superframe mode of operation. Framing status and control register 111 may also be employed by microcontroller 110 to perform additional signalling protocol control tasks, including controllably inserting an idle code on one or more selected channels, inserting a zero suppression code in a channel with a zero byte code, and provisioning yellow and blue alarm codes, as non-limitative examples.

The resulting framed data is coupled from framer 97 over link 98 through controllable relay loopback interface 85 and link 86 to line encoder 99. Using the transmit clock TCLK on line 53, line encoder 99 encodes the serial data in accordance with required format (e.g. by substituting a bipolar violation sequence for zeros in the case of B8ZS signalling) onto respective transmit positive TPOS and transmit negative TNEG lines 121, 123, in order to form the requisite bipolar signals. Equalizer 101 level-adjusts the bipolar signals and applies the adjusted signals via controllable loopback relay interface 73 to transformer-coupled transmit link pair 14T. The level adjustment effected by equalizer 101 assures that the level of the signals arriving at the far end of the link is at the correct level for the length of cable between sites.

The line interface unit further includes a status and control register unit 125, which stores status and control information relating to the operation of the line interface unit. Register unit 125 is accessed via bus 113 from microcontroller 110. As non-limitative examples of its use, register unit 125 may store a prescribed equalization level, monitor a loss of signal indication and monitor whether the transmitter is meeting a prescribed transmission specification.

The microcontroller 110 provides supervisory and operational control of both digroups of the line interface unit. It may be further coupled via an auxiliary interface bus 130 to a microcontroller interface 131 for responding to manually set option switches 133 and driving panel alarm indicators 135. Bus 130 may be further coupled to a serial interface 137, for providing auxiliary signalling, as through a local RS232 port 139. A non-volatile random access memory (NVRAM) 141 is also coupled with bus 130 to provide facility for storing configuration parameters that can be accessed in the event of a system anomaly (power failure).

Timing for the line interface unit is supplied by a voltage controlled oscillator (VCO) and clock control unit 140, which contains a precision crystal oscillator and phase lock loop and outputs a transmit clock signal TCLK on line 53. The receive clock RCLK and the transmit clock TCLK are compared with one another to generate an error signal which is coupled over line 141 to the phase lock loop input to clock control unit 140. A control input 143 is applied to unit 140 to control whether the output on link 53 is to be synchronized with the RCLK signal. When active, line causes the internal PLL to adjust the TCLK output signal, so as to drive the error signal on line 141 to zero and thereby bring the RCLK and TCLK into alignment with each other.

The incorporation of additional circuitry (shown in double lines in FIG. 4), through which the functionality of the line interface unit is enhanced to provide bidirectional signalling capability for facilitating performance monitoring of the DS0 loop, will now be described. As noted earlier, in the LIU of a conventional D4 channel bank, DS1 data that has been deframed from the T1 link is normally asserted output directly from ESF-to-SF frame bit converter 93 to RNPCM line 61 on the falling edge of the recovered clock signal RCLK, as RNPCM link is customarily employed for unidirectional signalling, carrying only DS1 data traffic from the LIU to an OCU-DP.

Figure 5:
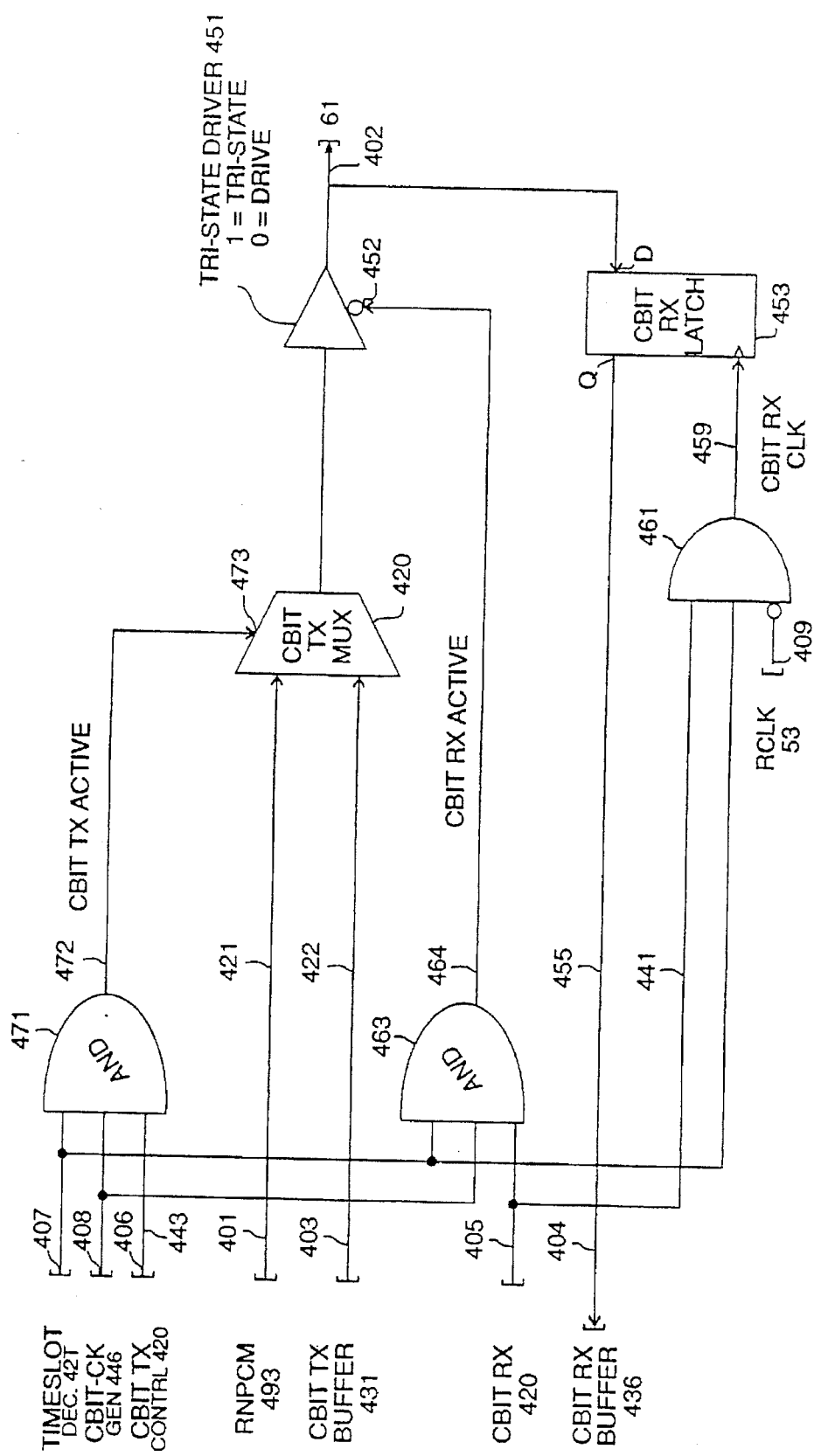
FIG. 5 is a detailed illustration of the configuration of a controllably tri-stated c-bit multiplexer employed in the line interface unit of FIG. 4.

In accordance with the invention, rather than connect line 61 directly to the output of ESF-to-SF frame converter 93, the LIU end of line 61 is terminated by way of a controllably tri-stated c-bit multiplexer 400, a detailed configuration of which is illustrated in FIG. 5. The other end of line 61 is similarly tri-state terminated via a respective multiplexer at the OCU-DP, so that link 61 may operate as a bidirectional communication link between the LIU and an OCU-DP. As will be explained, the time division multiplex format of this bidirectional signalling capability of line 61 is such that, during one or more timeslots associated with one or more destination channel units, outgoing information bits (I) from the LIU may be controllably multiplexed with additional control bits that make up a command message intended for the one or more destination channel units. In addition during time slots where data is not being transmitted, line 61 is provisioned to transmit response messages from one or more channel units back to the LIU.

Referring now to FIGS. 4 and 5, the output of ESF-to-SF frame bit converter 93 is coupled via a link 493 to a first, transmit data input 401 of a tri-stated control or c-bit multiplexer 400. Input port 401 is coupled via link 421 to a first input of a c-bit transmit multiplexer, the output of which is coupled to a tri-stated driver 451. Tri-stated driver 451 has an output which drives an I/O port 402. I/O port terminates the LIU end of communication link 61. I/O port 402 delivers deframed DS1 data (I bits) from frame bit converter 93, as well as command message or c-bits that are generated by microcontroller 110 and coupled therefrom to microcontroller communication link 410 into a command message transmit storage buffer 431. The contents of command message transmit storage buffer 431 are coupled over a link 432 to a second, c-bit input 403 of multiplexer 400. Input port 403 is coupled over line 422 to a second input of c-bit transmit multiplexer 420.

I/O port 402 of multiplexer 400 is also employed to receive the contents of a response message the has been asserted on link 61 from a channel unit. For this purpose, I/O port 402 is coupled to the data 'D' input of a receive latch 453, the Q output of which is coupled via line 455 to a receive bit output port 404. Receive bit output port is coupled over line 434 to a c-bit receive buffer 436. During the reception of the bits of a response message from a channel, multiplexer 400 clocks response message bits at I/0 port 402 onto line 434 from receive latch 453, for storage in c-bit receive buffer 436, in accordance with a c-bit receive clock signal produced on line 459 from an AND gate 461, as will be described. The bits of a response message that are stored in c-bit receive buffer 436 are readable by microcontroller 110 via control link 410 for appropriate action.

Multiplexer 400 further includes a first, receive select input 405, which is coupled via a c-bit receive control line 418 to a transmit/receive mode control register 420 and a second, transmit select input 406, which is coupled via a c-bit transmit control line 419 to transmit/receive mode control register 420. Transmit/receive mode control register 420 is controlled by microcontroller 110 to control whether multiplexer 400 is to operate in a data/command message transmission mode or in a response message receive mode. The first, receive select input 405 is coupled via line 441 to a first input of each of an AND gate and a first input of AND gate 461. The output of AND gate 463 is coupled over link 464 to the tri-state control input 452 of tri-state driver 451. The second, transmit select input 406 is coupled via line 443 to a first input of an AND gate 471. The output of AND gate 471 is coupled over link 472 to the select input 473 of transmit multiplexer 420.

Multiplexer 400 further includes additional inputs 407, 408 and 409 for controlling the sequencing/timing of its operation. Input 407, which is coupled over link 425 to a second input of each of AND gates 461, 463 and 471, is coupled over link 426 to a time slot decoder 427. Timeslot decoder 427 includes a preloadable counter and is coupled to link 418 from frame bit converter 93, which changes state at the time of occurrence of the first bit in the first frame of a superframe. The counter within decoder 427 begins counting down at the receive clock RCLK rate in response to the first bit signal on line 418, and timeslot decoder 427 provides an output on line 426 when the counter rolls over, corresponding to the time of occurrence of the timeslot address of the destination channel unit, so as to enable the interleaving of control message or c-bits with information (I) bits during the timeslot associated with the channel unit designated by microcontroller 110.

Figure 6:
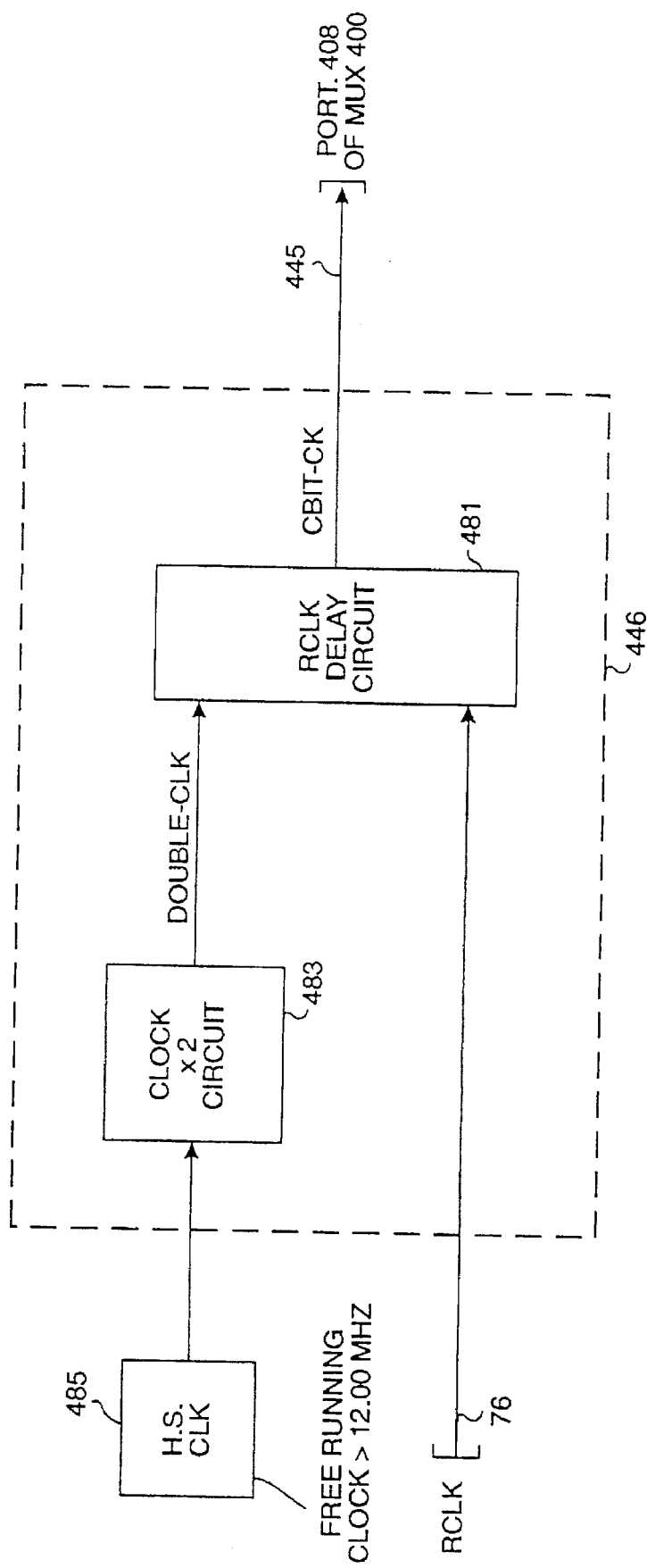
FIG. 6 is a detailed illustration of the configuration of the c-bit transmit clock generator employed in the line interface unit of FIG. 4.
Figure 7:
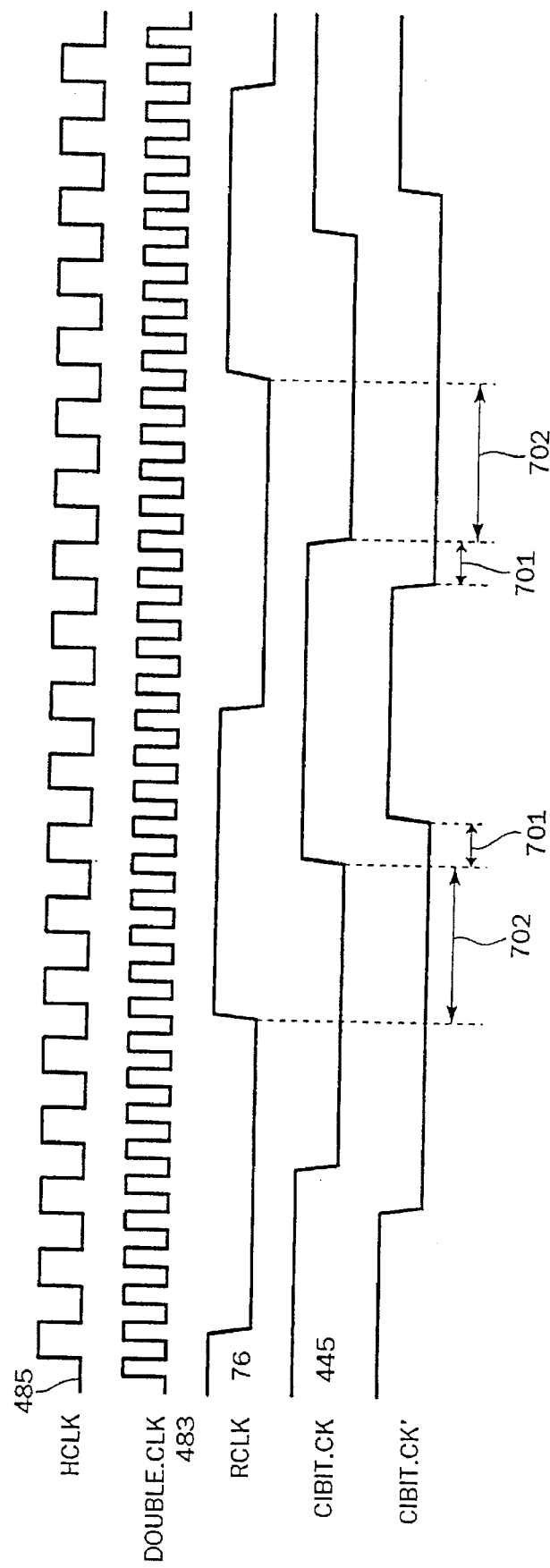
FIG. 7 is a timing diagram associated with the operation of the c-bit transmit clock generator circuit of FIG. 6.

Input 408, which is coupled to a third input of each of AND gates 463 and 471, receives a c-bit transmit clock signal via line 445 from a c-bit transmit clock generator 446, shown in detail in FIG. 6. As shown in FIG. 6, c-bit transmit clock generator comprises a receive clock RCLK delay circuit 481, which may comprise a sequentially clocked shift register, the data input of which is coupled to RCLK line 76 and the clock input of which is coupled to the output of a X2 clock multiplier 483 to which a high speed clock 485 (e.g. a free running clock having a clock frequency on the order of 12 MHz) is applied. A timing diagram associated with the operation of the c-bit transmit clock generator circuit of FIG. 6 is shown in FIG. 7. By coupling a selected stage of the sequentially clocked shift register within RCLK delay circuit 481, the time of occurrence or delay of the c-bit clock signal on link 445, relative to the falling edge of RCLK, is readily defined. As shown in FIG. 7, the falling edge of the c-bit transmit clock is delayed on the order of 90° with respect to the falling edge of the RCLK signal. Even though the illustrated example shows a 90° degree delay and a duty cycle on the order of 50%, it is to be understood that these are merely illustrative and not limitative of the timing that may be employed. A duty cycle of less that 50% for the c-bit clock and a delay other than that shown may be used, as illustrated at c-bit clock in FIG. 7, to provide an additional timing offset 701 to the timing differential 702 between the rising edge of RCLK and the rising and falling edges of the c-bit clock, thereby providing an additional margin of error against clock slips. The RCLK is coupled via port 409 to a third, inverting or NOT input of AND gate 461, so that AND gate 461 will be enabled on the negative-going edge of RCLK.

Figure 8:
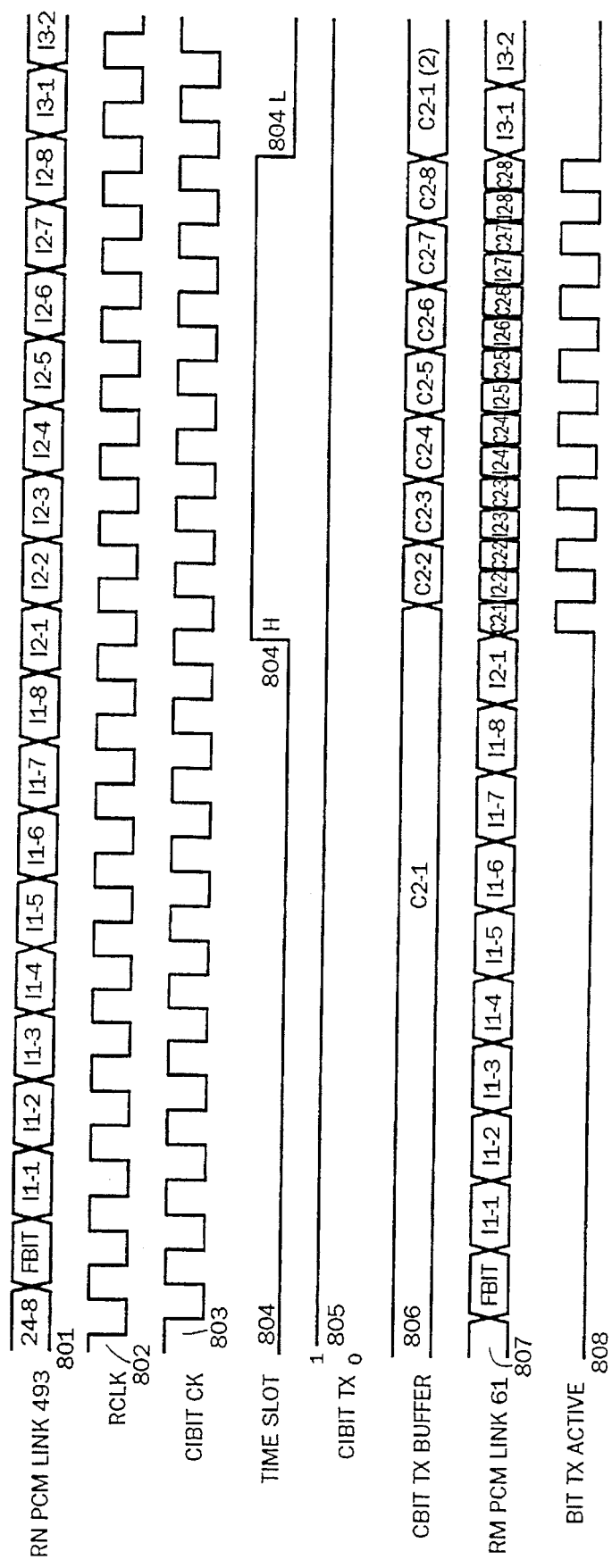
FIG. 8 is a timing diagram associated with the transmit mode of operation of the line interface unit of FIG. 4.
Figure 9:
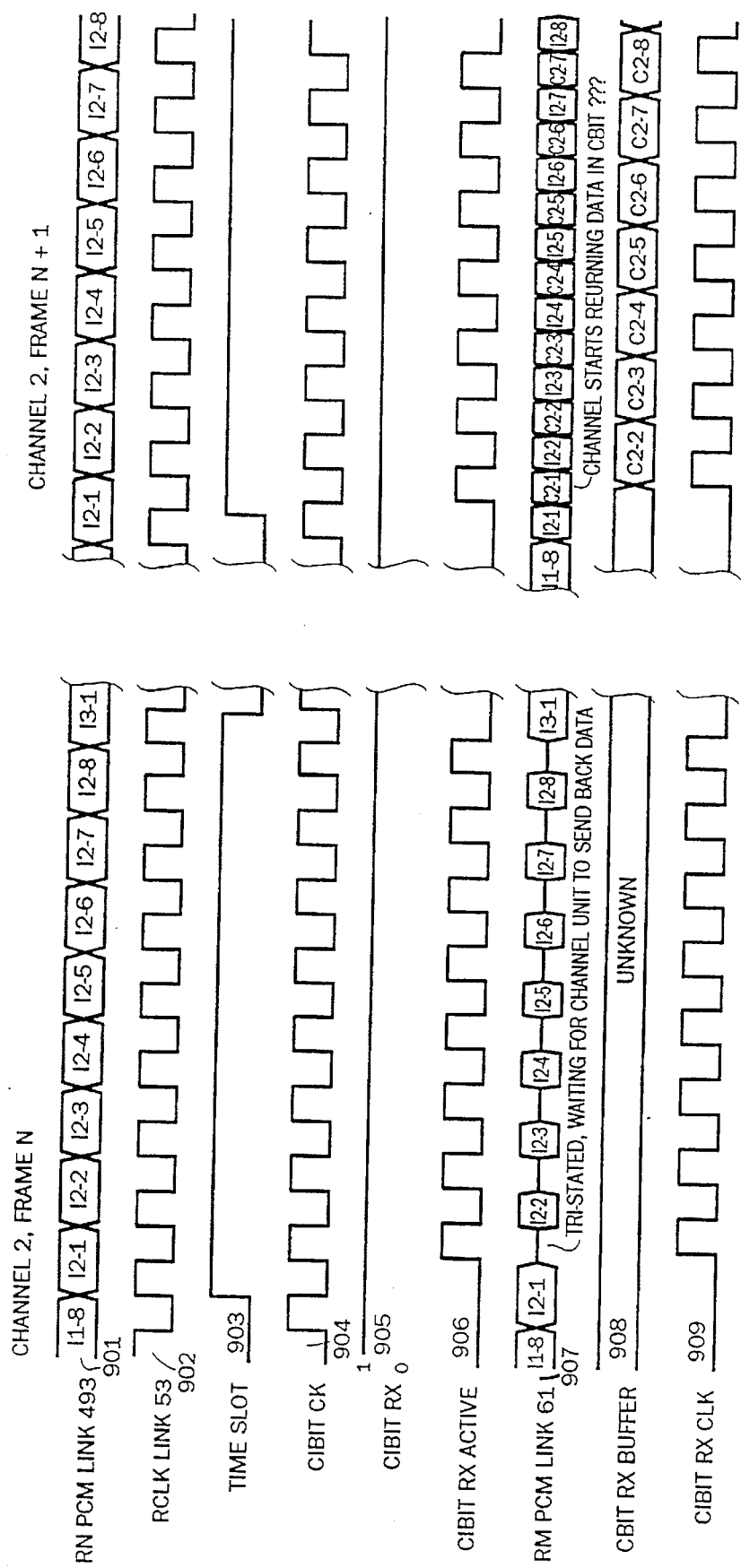
FIG. 9 is a timing diagram associated with the receive mode of operation of the line interface unit of FIG. 4.

The operation of the modified LIU of the enhanced D4 channel bank of FIG. 4 may be understood by reference to the timing diagrams of FIGS. 8 and 9. As pointed out previously, the incorporation of controllably tri-stated multiplexer 400 provides the LIU with the ability to perform bidirectional communications with an OCU-DIP via link 61. As noted briefly above, the time division multiplex format of the enhanced bidirectional signalling capability of line 61 is such that, during a transmission mode of operation of the LIU, one or more timeslots associated with one or more destination channel units, outgoing information bits (I) from the LIU may be controllably multiplexed with additional control bits that make up a command message intended for the one or more destination channel units. In addition during a receiving mode of operation, for time slots where data is not being transmitted from the LIU, line 61 is provisioned to transmit response messages from one or more channel units back to the LIU. Each mode of operation will now be individually described.

OPERATION

TRANSMIT MODE (FIG. 8)

During the transmit mode of operation, the LIU is operative to transmit data traffic that has been appropriately formatted by frame bit converter 93 over line 61 to a destination channel unit. For this purpose, as shown at data frame 801 of FIG. 8, respective bits Ii-1, Ii-2, ... Ii-8 of successive information bytes I1, I2, I3, ... are provided at the output of frame bit converter 93 and coupled over line 493 to data transmission input port 401 of multiplexer 400. The select input 473 of c-bit transmit multiplexer 420 is low in the absence of the interleaving of command message of c-bits with data bits of an information byte.

DATA TRAFFIC ONLY

It will be initially be assumed that only data traffic on line 493 is to be transmitted, there being no command message (c-bits) assembled by microcontroller 110 for transmission. The level of the timeslot input to port 407 of multiplexer 400 will therefore be low, as shown at 804 in FIG. 8, so the output of AND gate 420 is low, whereby c-bit transmit mux 420 couples data line 421 to driver 451. Since AND gates 461 and 463 are also coupled to timeslot input port 407, their outputs are also low. With the output of AND gate 463 low, tri-state driver is active, so as to drive line 61 with the signal level applied to its input, here data traffic supplied to input port 401 of mux 400, as shown at 807 in FIG. 8. Latch 453 is not clocked, since the output of AND gate 461 is held low.

DATA TRAFFIC PLUS COMMAND MESSAGE

Consider now the case where a command message has been assembled and loaded into c-bit transmit buffer 431 by microcontroller for transmission to a channel unit. The address of the channel unit corresponds to its associated TDM timeslot. As pointed out above timeslot decoder 427 provides an output on line 426 to input port 407 of mux 400 in association with a timeslot during which one or more c-bits are to be transmitted. For purposes of providing an illustrative example, the channel unit whose timeslot is associated with information byte I2 will be considered to be a destination address for which a command message is to be transmitted. This means that between successive ones of information bits I2-1 ... I2-8, one or more c-bits c2-1 ... c2-8 may be interleaved. It will be assumed that the command message contains a full eight bit control or command message byte.

As shown at 804H in FIG. 8, the timeslot signal from timeslot decoder 427 associated with channel 2 changes state (goes high) at the beginning of a channel 2 data byte, so that the signal level at input port 407 of mux 400 goes high at this time, thereby asserting a high input to each of AND gates 461, 463 and 471. Transmit line 419 from c-bit transmit/receive mode control register goes high in preparation for a command message transmission, as shown at 805 in FIG. 8, so that a high is asserted at input port 406 and applied to a second input of AND gate 471. Receive line 418 from c-bit transmit/receive control register remains low, so that a low is still asserted at input port 405 and applied via line 441 to each of AND gates 461 and 463. Thus the outputs of each of AND gates 461 and 463 remain low, as in the case of transmitting data traffic, described above.

The respective c-bits of the command message are coupled via line 432 to input port 403 so that they are sequentially available to the second input of c-bit transmit mux 420, as shown at 806 in FIG. 8. As pointed out earlier, the clocking of c-bit data for transmission is controlled by the c-bit clock supplied to mux input port 408 from c-bit clock generator 446. The c-bit clock is shown in FIG. 8 at 803, being delayed or offset from the RCLK signal shown at 802. Since mux input port 408 is the c-bit clock signal and the other to input ports are asserted high, then the output of AND gate 471 on link 472 will track the c-bit clock signal as shown at 808 in FIG. 8. Thus c-bit mux 420 will couple c-bits on line 422 to driver 451 during the high level of the c-bit clock, and will couple data traffic on line 421 to driver during the low level of the c-bit clock. In other words, data traffic or information bits I are interleaved with command message or c-bits and asserted onto bidirectional communications link 61 in accordance with the c-bit clock, as shown at 807 in FIG. 8.

At the conclusion of timeslot 2, the timeslot input to port 407 goes low, as shown at 804L in FIG. 8, so that the output of AND gate 471 goes low and thereby interrupting the transmission of any further c-bits that may be intended for channel unit-2 until timeslot-2 is again active. Thus, the next byte of information bits I3-1 ... I3-8 will be transmitted without interleave c-bits, as shown at 807 in FIG. 8. For a typical command message transmit buffer 431 may contain the next byte of the command message, so that the first control bit c2-1 of the next frame is ready for transmission at the conclusion of clocking out of c-bit cl-8, as shown at 806 in FIG. 8.

RECEIVE MODE (FIG. 9)

When the LIU has transmitted a command message to a destination channel unit, as described above, it expects to receive a response or reply message back from that channel unit. During this third mode of operation, the clocking of an outgoing data frame is modified, so as to allow for the return of response message bits on the bidirectional line 61 from the response message sourcing channel unit during time intervals that are interleaved with the data traffic. For this purpose, rather than hold the control input to tri-stated driver 451 low for the entirety of a data frame, during the timeslot associated with the channel unit from which a response message is expected, the control input 452 to tri-stated driver 451 is driven by the output of AND gate 463 in accordance with the c-bit clock, so that outgoing data traffic from the LIU is asserted onto line 61 only during the logical high portions of the c-bit clock, thereby allowing response message c-bits to be asserted onto link 61 by the responding channel unit, during low portions of the c-bit clock.

For the present example of bidirectionally communicating with channel unit-2, respective bits Ii-1, Ii-2, ... Ii-8 of successive information bytes I1, I2, I3, ... of an arbitrary frame N, shown at 901 in FIG. 9, are provided at the output of frame bit converter 93 and coupled over line 493 to data transmission input port 401 of multiplexer 400. Prior to the timeslot associated with channel unit 2, the timeslot lead input to port 407 of mux 400 is low, so that the select input 473 of mux 420 is held low, and information bits of byte I1 are asserted in sequence onto line 61 by the LIU, as shown at 907 in FIG. 9.

For frame N, at the beginning of the timeslot of channel unit 2, shown at 903 in FIG. 9, the level of the timeslot input to port 407 of multiplexer 400 will go high, thereby asserting a high input to each of AND gates 461, 463 and 471. Transmit line 419 from c-bit transmit/receive control register is low, since no command message transmission is to take place. Since input port 406 is held low, the output of AND gate 471 on select control line 472 to select input 473 of Multiplexer (mux) 420 is pulled low, so that mux 420 will couple data traffic bits I on line 421 to driver 451.

On the other hand, as shown at 905 in FIG. 9, receive line 418 from c-bit transmit/receive control register is asserted high, so that a logical high is applied to input port 405 and applied via line 441 to each of AND gates 461 and 463. Thus, two of the three inputs to each of AND gates 461 and 463 are asserted high. The third input of AND gate 463 is coupled to receive the c-bit clock signal applied to mux input port 408, as shown at 904 in FIG. 9. Thus, the output of AND gate 463 on link 464 will track the c-bit clock signal as shown at 908 in FIG. 9, whereby driver 451 is alternately switched to drive line 61 with the data supplied by mux 420 and is tri-stated to allow the channel unit to assert response bits on the line. Namely, driver 451 will assert information bits onto line 61 during the low level of the c-bit clock, shown at 906 in FIG. 9, and will be tri-stated during the high level of the c-bit clock, as shown at 907 in FIG. 9, to allow for the assertion of response message c-bits onto line 6 by the channel unit. At the termination of timeslot 2, the timeslot port 407 again goes low, so that mux 420 couples data traffic line 421 to driver 451, which is now driven active, whereby data traffic is continuously asserted onto line 61.

It will now be assumed that during the next frame (frame N+1) channel unit 2 drives line 61 with a response message during its timeslot. Again, at the beginning of the timeslot of channel unit 2, the level of the timeslot input to port 407 of multiplexer 400 will go high, thereby asserting a high input to each of AND gates 461, 463 and 471. Transmit line 419 from c-bit transmit/receive control register is low, since no command message transmission is to take place. Since input port 406 is held low, the output of AND gate 471 on select control line 472 to select input 473 of mux 420 is pulled low, so that mux 420 will couple data traffic bits I on line 421 to driver 451, as described above in connection with frame N.

Since receive line 418 from c-bit transmit/receive control register continues to be asserted high, two of the three inputs to each of AND gates 461 and 463 are asserted high. Since the third input of AND gate 463 is coupled to receive the c-bit clock signal applied to mux input port 408, as shown at 904 in FIG. 9, the output of AND gate 463 on link 464 will track the c-bit clock signal as shown at 908 in FIG. 9, whereby driver 451 is alternately switched to drive line 61 with the data supplied by mux 420 and is tri-stated to allow the channel unit to assert response bits on the line, so that driver 451 will assert information bits onto line 61 during the low level of the c-bit clock, shown at 906 in FIG. 9, and will be tristated during the high level of the c-bit clock, as shown at 907 in FIG. 9, to allow for the assertion of response message c-bits onto line 6 by the channel unit.

For frame N+1, response message bits, shown at c2-1, c2-2, ... , c2-8 are asserted on the line 61 in between information bits of the I byte, as shown at 907 in FIG. 9. Successive c-bits of the response message are clocked through latch 453 on the rising edge of the c-bit receive clock, shown at 909 in FIG. 9, as supplied on line 459 from AND gate 461 in synchronism with the falling edge of the RCLK signal, shown at 902 in FIG. 9, which drives the inverted input to AND gate 461. As the response message c-bits are sequentially clocked through latch 453 they are applied via line 455 to receive bit output port 404 of mux 400 and loaded into c-bit receive buffer 436 under the control of the RCLK signal, as shown at 908 in FIG. 9. Once loaded into receive buffer 436 the response message may be downloaded via bus 410 by microcontroller 110 into attendant memory for appropriate action.

Figure 10:
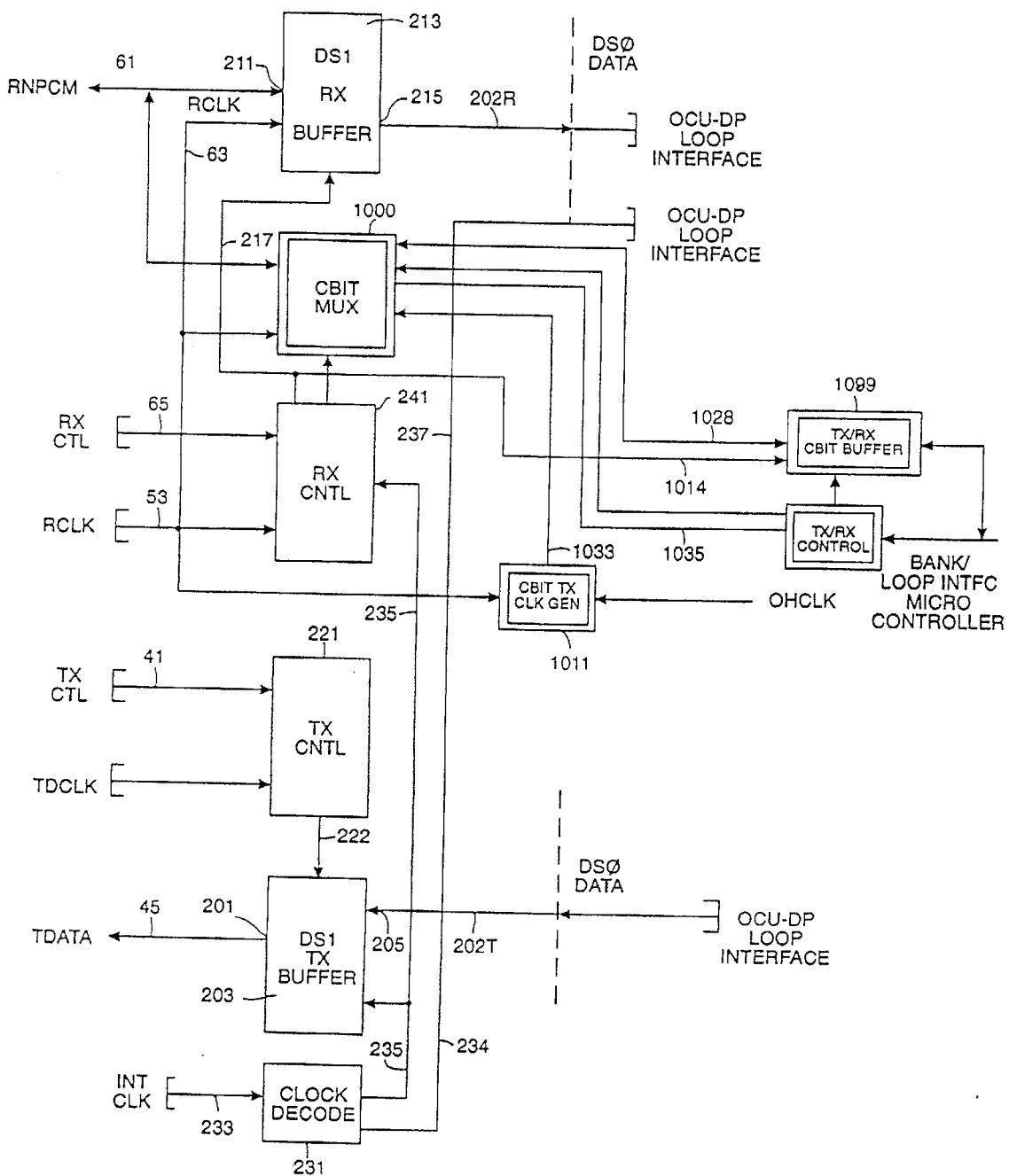
FIG. 10 diagrammatically illustrates the manner in which the channel bank interface portion of an office channel unit data port may be modified in accordance with the present invention to incorporate additional circuitry to provide the channel unit with bidirectional signalling capability for facilitating performance monitoring of a DS0 loop.

FIG. 10 diagrammatically illustrates the manner in which the channel bank interface portion of an office channel unit data port (OCU-DP) is modified to incorporate additional circuitry (shown in double lines in FIG. 10), that provides the channel unit with bidirectional to signalling capability for facilitating performance monitoring of the DS0 loop, will now be described. Again, the convention used with the line interface unit of FIG. 4 will be employed, depicting the components of the bank interface portion of a conventional OCU-DP in single lines, while the upgrading circuit components of a performance-monitoring OCU-DP in accordance with the present invention are shown in double lines and are identified by four digit reference numerals, here beginning with the numerical prefix '10'. In order to facilitate the description, the configuration and operation of a conventional OCU-DP bank interface will be briefly reviewed, followed by a description of the additional circuitry which provides the conventional OCU-DP bank interface with performance-monitoring capability. It should be understood that what is illustrated in FIG. 10 corresponds to one-half of a digroup within the channel bank; the other half of the digroup has been omitted from FIG. 10 in order to simplify the drawing.

The transmit data TDATA portion 45 of the intra bank PCM communications link, which outputs DS1 traffic to LIU 12, is coupled to an output port 201 of a DS1 transmit buffer 203. DS1 transmit buffer 203 has an input port 205 to receiver from a DS0 transmit link 202T, (64 Kb/s) DS0 bipolar signalling corresponding to the DS0 data that has been coupled from the transmit portion of a four wire metallic loop from the customer site, assembled and timed for transmission to the LIU, as will be described. DS1 transmit buffer 203 comprises an elastic buffer configuration for accommodating timing jitter/phase misalignment during unloading of the buffer onto the DS1 line 45 and loading the buffer with DS0 data in accordance with a decoded byte clock signal on line 235 supplied by a clock decoder 231 to a transmit control logic circuit 221, as will be described.

The read-out or unload sequence for asserting DS1 data from transmit buffer 201 onto the transmit data TDATA line 45 is determined from transmit control sequence signals supplied from transmit unit 35, via link 41, to transmit control logic circuit 221. Data that has been loaded into transmit buffer 201 from DS0 transmit link 202T is unloaded and asserted onto TDATA line 45 in accordance with a control signal applied over line 222 from transmit control logic circuit 221, eight bits or a byte at a time, in synchronization with transmit clock TDCLK applied over link 43 from transmit unit 35 to transmit control logic circuit 221.

Clock decoder 231 is coupled to line 233 to receive a 64 KHz integrated clock signal, which has a byte boundary represented by a 12 V high pulse, with (seven) bit boundaries indicated by 6 V high pulses. Clock decoder produces a byte clock on line 235 for each 12 V high pulse (or every eight bits) and a bit clock on line 234 for each bit at a 64 KHz rate for DS0 signalling. Byte clock line 235, in addition to being coupled to transmit control logic circuit 221, is also coupled to a receive control logic circuit 241, in order to control the unloading of DS0 data from a DS1 receive buffer 213, via clock line 217. Bit clock line 234 is coupled to rate conversion circuitry in the OCU-DP loop interface (to be described).

PCM communication link 61 from the LIU 12, which receives DS1 data traffic from LIU 12 (and also exchanges performance monitoring command/response messages with the LIU, as described above with reference to FIGS. 4–9 and as will be described below) is coupled to an input port 211 of DS1 receive buffer 213. Successive information bits of incoming DS1 data traffic are clocked into DS1 receive buffer 213 on the rising edges of the receive clock RCLK on line 63. Byte clock line 217 from receive control logic circuit 241 is used to delineate a byte of data, so that receive control logic circuit 241 loads incoming DS1 serial data on link 61 eight bits or a byte at a time into a parallel data holding register within received buffer 213 in accordance with sequence control leads of link 65 from receive unit 34.

DS1 receive buffer 213 has an output port 215 coupled to transmit outgoing DS0 signalling onto a receive DS0 link 202R. DS0 link is coupled through loop interface circuitry to be described to the receive portion of the four wire metallic loop to the customer. DS0 data is asserted from output port 215 of receive buffer 213 onto DS0 line 202R in accordance with clock signals on link 217 from receive control logic circuit 241. Like DDS1 transmit buffer 203, DS1 receive buffer 213 comprises an elastic buffer configuration for accommodating timing jitter/phase misalignment during unloading of the buffer onto the DS0 line 202R and loading the DS1 receive buffer 213 with DS1 data.

Figure 11:
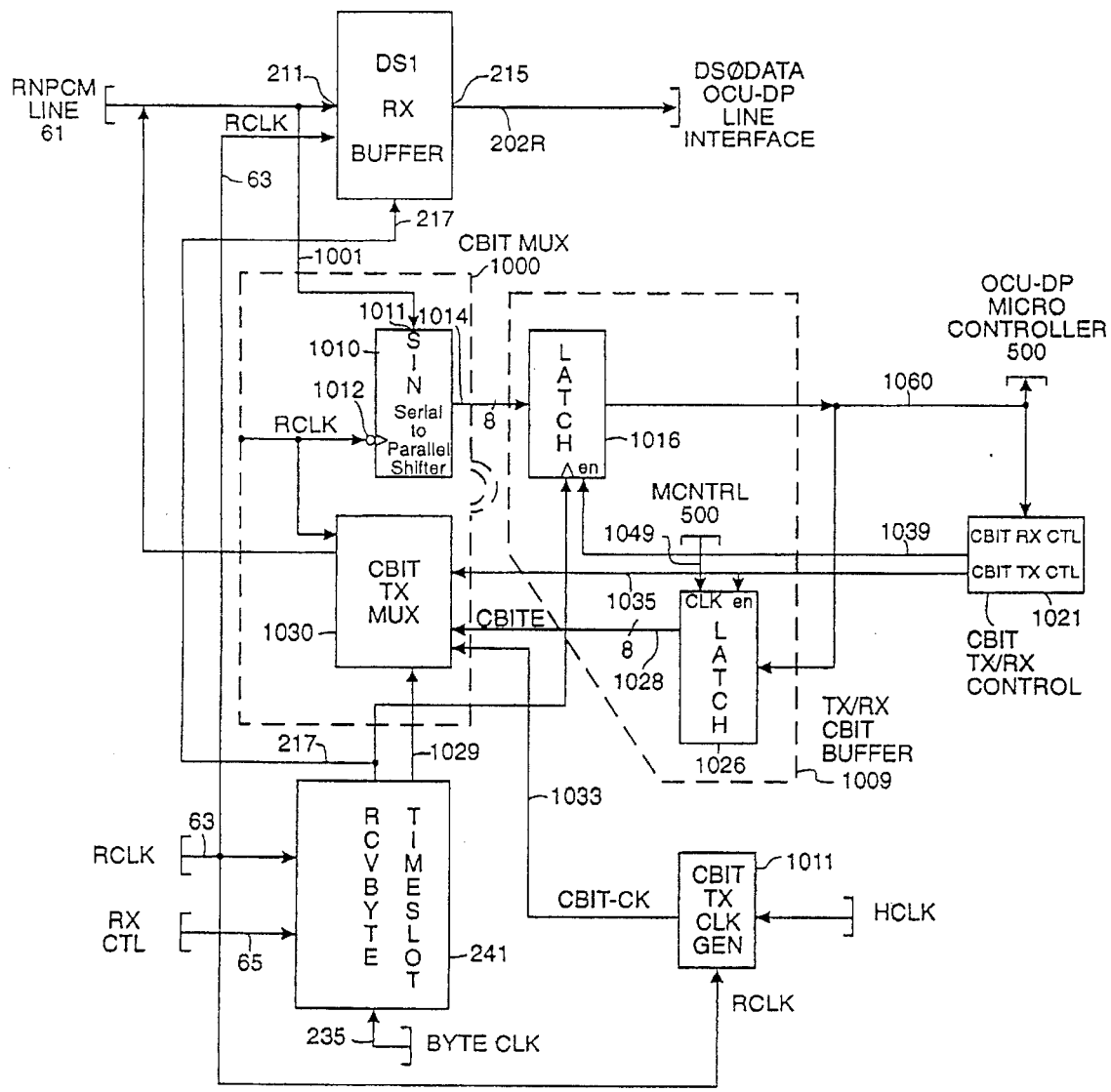
FIG. 11 shows the configuration of a c-bit multiplexer incorporated in the channel bank interface of FIG. 10.

The additional circuitry of the upgraded bank interface portion of the OCU-DP of the present invention, through which the functionality of a conventional OCU-DP is enhanced to provide performance monitoring, bidirectional signalling capability over line 61, is shown in double lines in FIG. 10 and is also shown separately in FIG. 11. As in the enhanced LIU, described above, incorporating bidirectional communication capability into the bank interface portion of the OCU-DP involves coupling line 61 to a controllably tri-stated control bit (c-bit) multiplexer (MUX) 1000.

As shown in FIG. 11, c-bit MUX 1000 has a serial input port 1001 which is coupled to a serial input 1011 of a serial-in, parallel or byte-out shift register 1010, an inverted clock input 1012 of which is coupled to RCLK line 63, so that data is loaded into register 1010 on the falling edge of RCLK. The contents of the respective stages of byte register 1010 are coupled over eight-bit link 1014 and latched into a to a c-bit receive latch 1016 resident within a transmit/receive c-bit buffer 1009. C-bti receive latch is coupled to receive respective enable and clock inputs via c-bit receive line 1039 from transmit/receive control unit 1021 and receive byte line 217 from receive control logic circuit 241. The contents of c-bit receive latch 1016 are controllably read out via link 1060 for application to an OCU-DP microcontroller 500. Transmit/receive c-bit buffer 1009 also includes a c-bit transmit latch 1026, which is controllably loadable by the OCU-DP microcontroller 500 via link 1060 with the respective bits of a response message, to be transmitted to the LIU during time intervals that are interleaved with incoming data traffic, as shown in FIG. 9, described above. The respective stages of c-bit transmit latch 1026 are coupled over eight bit wide input link 1028 to a c-bit transmit mux 1030. C-bit transmit latch 1026 has respective clock and enable inputs coupled to clock control link 1049 from microcontroller 500 and c-bit transmit link 1035 from transmit/receive control unit 1021.

Figure 12:
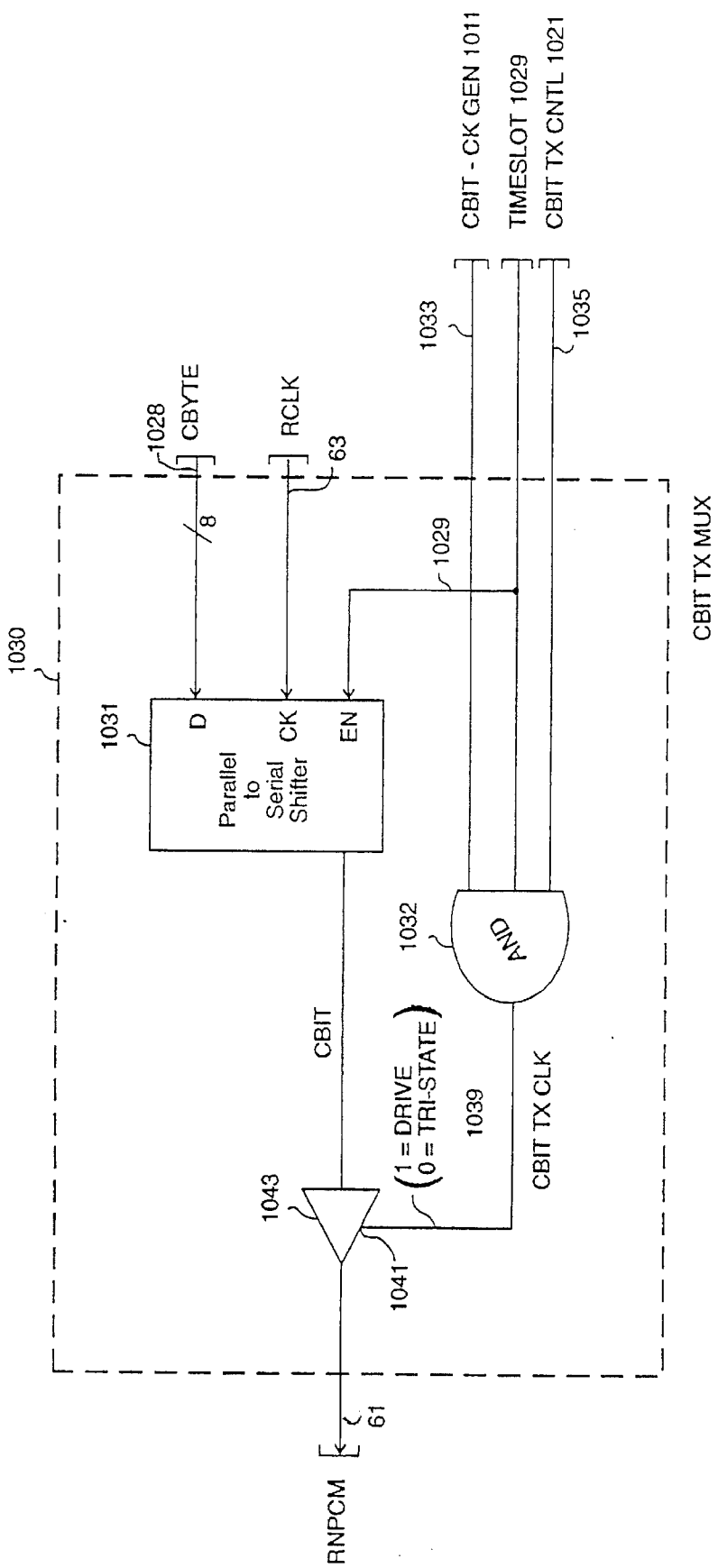
FIG. 12 shows the configuration of a c-bit transmit multiplexer incorporated in the c-bit multiplexer of FIG. 11.

C-bit transmit mux 1030 is shown in detail in FIG. 12 as comprising a parallel-to-serial shift register 1031 to respective stages of which link 1028 is coupled. The respective c-bits of a response message byte that has been loaded into register 1031 are read out in accordance with the RCLK signal on line 63. Register 1031 is enabled in response to a high logic level being asserted on timeslot line 1029 from timeslot generator 241, indicating that the channel unit has access to the communications link in accordance with its predefined timeslot. Timeslot line 1029 is also coupled to a first input of AND gate 1032. A second input of AND gate 1032 is coupled to a c-bit clock line from a c-bit clock generator, the configuration of which corresponds to that of the c-bit clock generator shown in FIG. 6, described above. A third input of AND gate 1032 is coupled to a c-bit transmit control line 1035 from a transmit/receive mode control register 1021. Via register 1021, microcontroller 500 asserts c-bit transmit control line 1035 high in preparation of transmission of a response message. Otherwise line 1035 is asserted low. The output of AND gate 1032 is coupled via link 1039 to a tri-state control input 1041 of a tri-stated driver 1043. Tri-stated driver 1043 is coupled via line 1045 from register 1031 and is operative to drive line 61 with successive c-bits as they are serially clocked out of register 1031 under the control of RCLK.

OPERATION

RECEIVE MODE (FIG. 13)

Figure 13:
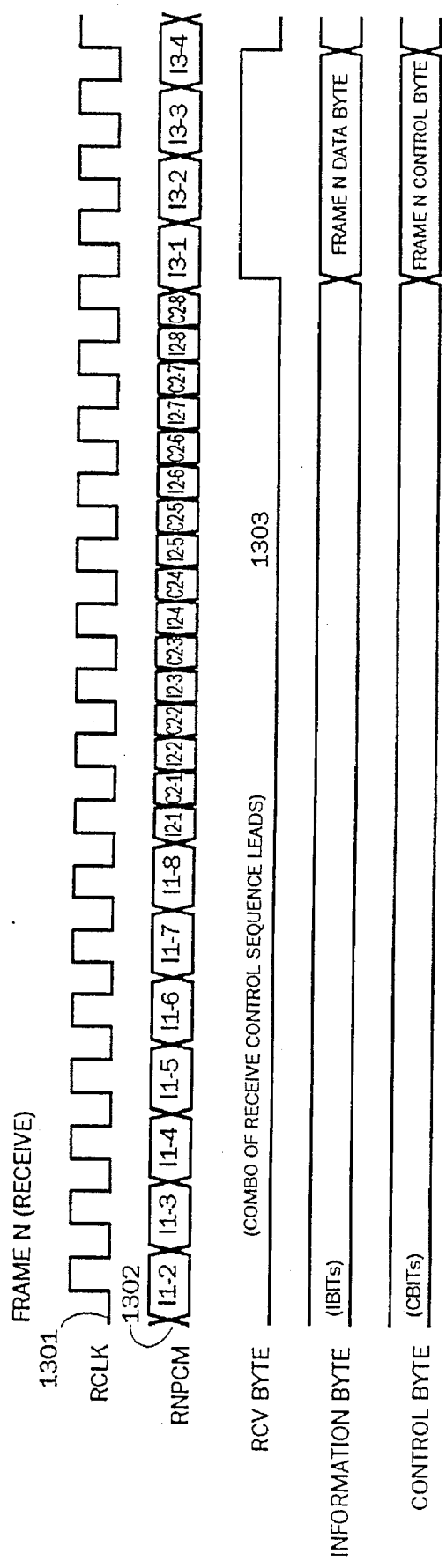
FIG. 13 is a timing diagram associated with the receive mode of operation of the channel bank interface of FIG. 10.

During the receive mode of operation, the OCU-DP bank interface is operative to receive incoming DS1 data traffic on line 61 from the LIU. It is also operative to receive any command message or c-bits that have been interleaved with the DS1 data. For the present example involving channel unit-2 as a destination channel unit for a command message from the LIU, then, as shown at 1302 in FIG. 13, during an arbitrary frame N, the first DS1 data byte clocked over line 61 will contain no interleaved data intended for channel unit-2, as respective bits Ii-1, Ii-2, . . . Ii-8 of successive information bytes I1, I2, I3, . . . are clocked over line 61 to data transmission input port 211 of DS1 receive buffer 213 and also present at input port 1001 of mux 1000. Since register 1010 is normally enabled only during timeslot-2, associated with channel unit-2, data is not clocked into and captured by register 1010 in accordance with the RCLK signal shown at 1301 in FIG. 13.

During timeslot-2, however, register 1010 is enabled, so that c-bits c2-1 . . . c2-8, that are interleaved with information bits I2-1 . . . I2-8, may be clocked into register 1010 on the falling edges of the RCLK signal, as shown at 1302 in FIG. 13. During this time, the logic level of the c-bit control line 1035 will be asserted low, so as to disable AND gate 1032 and thereby tri-stating driver 1043, so as to prevent line 61 from being asserted with outgoing data by driver 1043.

As the data is clocked in under the control of the RCLK signal on line 63, it is then clocked into latch 1016 of transmit/receive buffer 1009, so that it may be read by microcontroller 500 via link 1060.

TRANSMIT MODE (FIG. 14)

Figure 14:
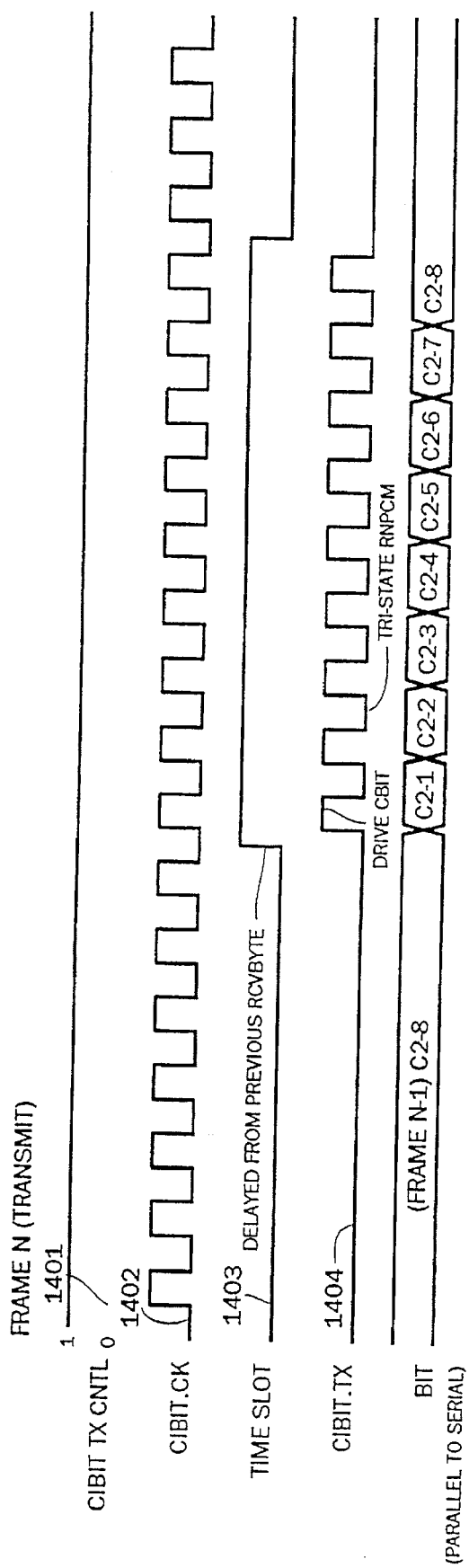
FIG. 14 is a timing diagram associated with the transmit mode of operation of the channel bank interface of FIG. 10.

As described above, after the LIU has transmitted a command message to a destination channel unit, as described above, it looks for a response or reply message back from that channel unit. During this transmit mode of operation of the OCU-DP, c-bits that have been loaded by microcontroller 500 into transmit latch 1026 are transferred in parallel from latch 1026 via c-bit byte link 1028 into register 1031 of c-bit transmit mux 1030. During timeslot-2, both the c-bit transmit control line 1035 and the timeslot lead 1029 will be asserted high, as shown 1401 and 1403, respectively, in FIG. 14, so as to enable two of the three inputs of AND gate 1032 and enable register 1031 to be clocked. Then, during logical high levels of the c-bit clock signal, tri-state driver 1043 is enabled, as shown at 1404 in FIG. 14, to drive line 61 with the respective c-bits c2-1 ... c2-8 that are clocked out in accordance with the RCLK, as shown at 1405 in FIG. 14.

Figure 15:
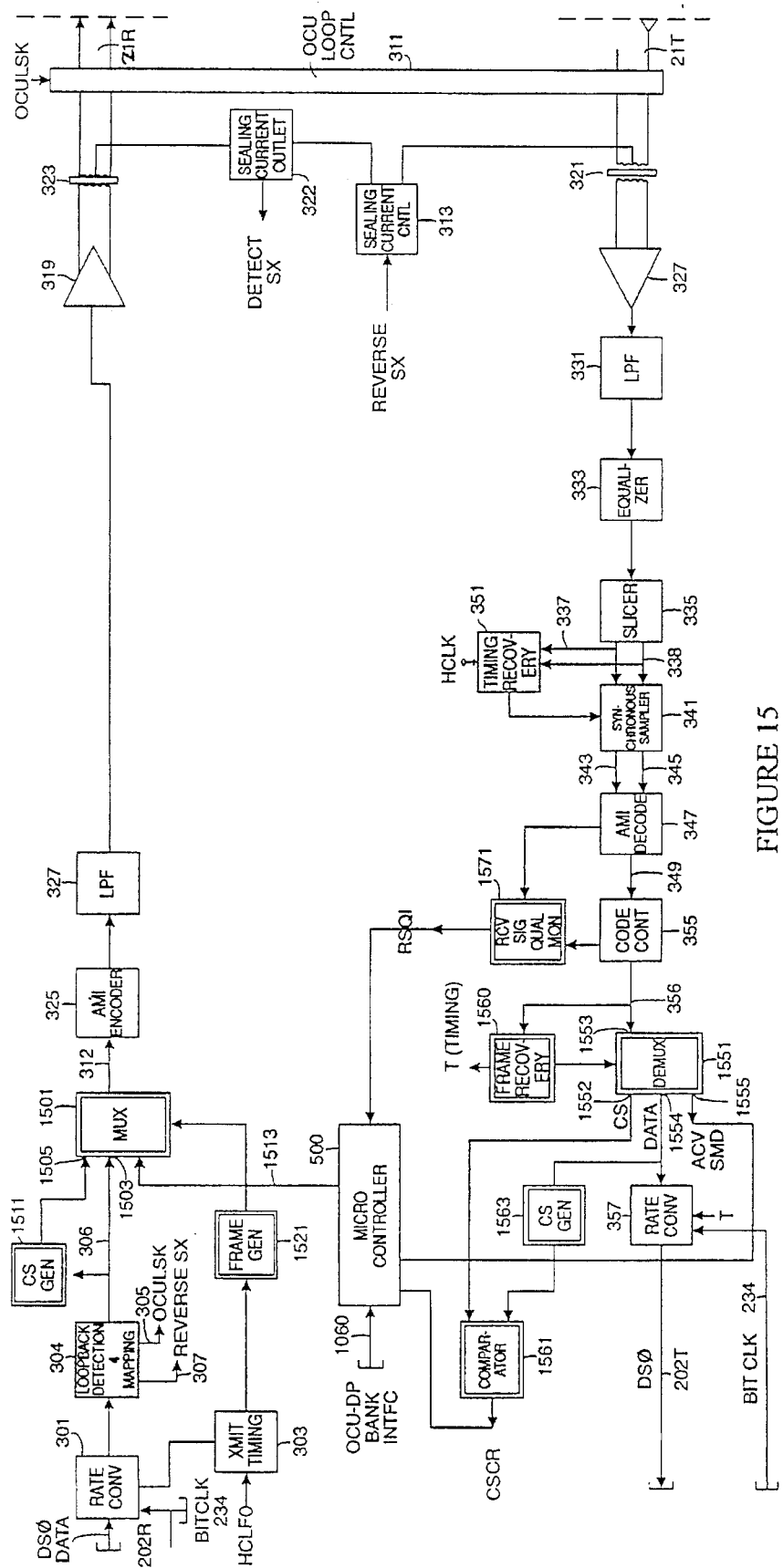
FIG. 15 illustrates a DS0 loop interface portion of an office channel unit data port modified in accordance with the present invention to conduct performance monitoring signalling with a down-loop digital data service network termination.

FIG. 15 illustrates the modification of the DS0 loop interface portion of an office channel unit data port (OCU-DP) to provide performance monitoring capability. Again, using the single line, double line convention employed in FIGS. 4 and 10, described above, components of the loop interface portion of a conventional OCU-DP are shown in FIG. 15 single lines; the upgrading circuit components are shown in double lines and are identified by four digit reference numerals, here beginning with the numerical prefix '15'. Also, in order to facilitate the description, the configuration and operation of a conventional OCU-DP loop interface will be briefly reviewed, followed by a description of the additional circuitry which provides the conventional OCU-DP loop interface with performance-monitoring capability.

As described above, DS1 data that has been received and buffered in DS1 receive buffer 213 within the bank interface of FIG. 10 is clocked at the rising edge of the RCLK onto DS0 link 202R. Link 202R is coupled to a data rate converter 301, which down converts the 64 Kb/s data rate of the received DS0 data to the data rate of the customer's digital signalling equipment, such as 9.6 Kbaud, 4.8 Kbaud, etc. under the control of a timing circuit 303. Data rate converter 301 is also coupled to receive the bit clock line from the clock decoder (231 in FIG. 10). Data rate converter timing circuit 303 is also driven by a high frequency clock (e.g. 10 MHz) that is derived from a phase lock loop driven by the bit clock line.

The down-converted DS0 data stream output from data rate converter 301 is coupled to a loopback detection and mapping operator 304, which is operative to detect the presence of an embedded command that may have been inserted from the network into the DS0 data instructing the channel unit loop interface to go into loopback or to reverse the sealing current. The presence of these respective commands are coupled via links 305, 307 to a controlled loopback (relay) interface 311 and to a sealing current control circuit 313, respectively. Sealing current control circuit 313 is coupled to coupling transformer 321 and via a sealing current detect circuit 322 to a coupling transformer 323 of loopback relay interface 311.

In a conventional OCU-DP loop interface, the output of loopback detection and mapping operator 304 is coupled directly via link 306 to an alternate mark inversion (AMI) encoder 325. In accordance with the present invention, accommodation is provided for additional performance monitoring signalling by way of a multiplexer 1501, to be described below. In the absence of the coupling of additional performance monitoring status and control signals to be described, multiplexer 1501 couples the signals on link 306 at a first input port 1503 to output port 1504, which is coupled via line 312 to AMI encoder 325. The output of encoder 325 is coupled through a low pass filter 327, and applied to a bipolar signal generator 319. The bipolar output leads of bipolar signal generator 319 are coupled via transformer 323 and loopback interface 311 to an outgoing tip and ring pair T1, R1 of the receive portion 21R of the four wire metallic loop 21 to a network termination unit (DDST) shown in FIG. 16 (to be described), to which the customer's digital services equipment is connected.

On the return path, bipolar signals from the tip and ring leads T and R of the transmit portion 21T of the metallic four wire pair of the local loop 21 from the customer premises are coupled through relay loopback interface 311. Relay loopback interface 311 couples respective tip and ring inputs of link 21T to a bipolar receiver 327. The output of bipolar receiver 327 is coupled through a second order low pass filter 331 to an equalizer 333. Equalizer 333 provides amplitude and frequency compensation for the loop cable 21.

To recover data within the incoming bipolar data stream from local loop 21, the output of equalizer 333 is coupled to a bit slice circuit 335, which is operative to compare the equalized signal to threshold levels, which are typically set at one-half the magnitude of the positive and negative peaks of the bipolar data stream and outputs a dual polarity digital representation of the received data on complementary polarity links 337, 338. The data is sampled in a synchronous sampling circuit 341 and coupled over respective positive and negative polarity data links 343 and 345 to an AMI decoder 347, which outputs digital serial data on line 349 in accordance with the contents of the AMI data stream. The output of bit slicer 335 is also coupled to a timing recovery circuit 351 for controlling the operation of synchronous sampling circuit 341, using the high frequency clock from the D4 bank clock recovery loop, described above. Line 349 from AMI decoder 347 is coupled to a loop-to-network code converter 355 which converts, as necessary, the AMI decoded data into binary data and couples the digital bit stream via line 356 to a demultiplexer 1551.

In a conventional OCU-DP loop interface, the output of code converter 355 is coupled directly via link 356 to a rate converter 357, which is operative to provide a 64 Kb/s (DS0) data stream for application via transmit link 202T to DS1 transmit buffer 203 of the OCU-DP bank interface. In accordance with the present invention, accommodation is provided for additional performance monitoring signalling by way of a demultiplexer 1551, to be described below. In the absence of the coupling of additional performance monitoring status and control signals to be described, demultiplexer 1551 couples the DS0 signals on link 356 at input port 1553 to a first output port 1554, which is coupled to data rate converter 357. The data rate converted (64 KB/s) DS0 signals are applied to link 202T for application to the DS1 transmit buffer 203, shown in FIG. 10, described above.

The incorporation of additional circuitry shown in double lines in FIG. 15, through which the functionality of the loop interface portion of the OCU-DP is enhanced to provide DS0 loop performance-monitoring capability, will now be described. In accordance with the invention, this additional capability is provided by the insertion of framing and error detection (e.g. check sum or CRC) sequences into the DS0 data stream transmitted to the downstream DDST, and by monitoring the incoming DS0 data from the customer end of the loop for performance representative signalling that has been inserted onto on the transmitted DS0 data stream from the DDST.

For this purpose, at the DS0 side of the loop interface, multiplexer 1501 is provided with a second input port 1505, which is coupled to the output of an error detection sequence generator 1501, to which the respective data bits of the DS0 data stream are applied. A third input port 1507 of multiplexer 1501 is coupled to link 1513 from microcontroller 500 (FIG. 10) to receive processor-based supervisory message data signals, such as an instruction to report stored error information.

The select input 1506 of multiplexer 1501 is controlled by a frame generator 1521, which defines the composition of the DS0 data frame to be forwarded to the DDST (FIG. 16) in accordance with a prescribed framing pattern. The framing generator 1521 sequentially varies the throughput path of multiplexer 1501, so as to selectively assemble the data, and overhead/control information in the form of an error detection sequence and supervisory message bits into a composite DS0 message pattern for application to link 312.

On the return path from the DDST, line 356 at the input port 1553 of demultiplexer 1551 is coupled to a frame recovery unit 1560, which extracts the framing overhead information from the DS0 data stream output by code converter 355 and controls the throughput of demultiplexer 1553 to a respective one of output ports 1553, 1554 and 1555. Demultiplexer output port 1553 is coupled to one input of a comparator 1561, a second input of which is coupled to the output of an error detection sequence generator 1563, the error detection algorithm of which corresponds to that employed by an error detection sequence generator in the DDST, as will be described. The output of comparator 1561 is coupled to microcontroller 500 as a return loop performance representative input.

An additional performance measure is derived by way of a receive signal quality monitor unit 1571 which is coupled to AMI decoder 347 and code converter 355. This unit monitors whether any code violation in the signal sequence applied to AMI decoder 347 has occurred, and whether a detected violation is legal or illegal, as indicated by a violation status bit on line 1573 from code converter 355. The output is reported as a receive signal quality indication to microcontroller 500.

Figure 16:
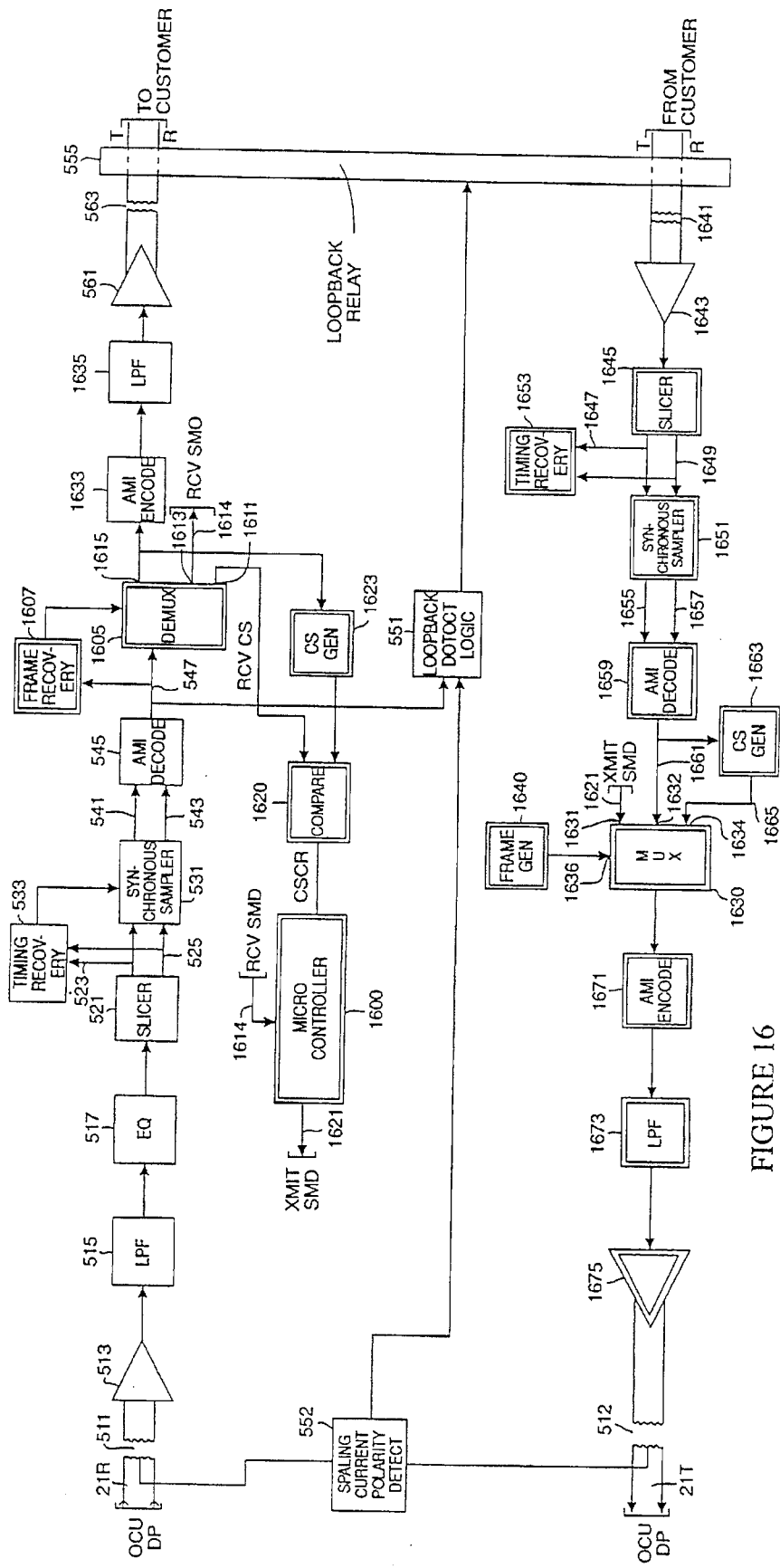
FIG. 16 diagrammatically illustrates the configuration of a digital data services network termination (DDST), which includes signalling and performance monitoring signal processing components which are complementary to those contained within the DS0 loop interface of FIG. 15.

FIG. 16 diagrammatically illustrates the signalling and performance monitoring signal processing components contained within a digital data services network termination (DDST), that terminates the metallic loop 21 with a data service unit/channel service unit (CSU/DSU) located at the customer's premises. The DDST of FIG. 16 includes signal processing components that accommodate the performance monitoring enhancements described above in connection with the description of the loop interface portion of the OCU-DP diagrammatically illustrated in FIG. 15. As in the case of the single line, double line convention employed in FIGS. 4, 10 and 15 described above, components of a conventional DDST are shown in FIG. 16 single lines; the performance monitoring capability circuit components are shown in double lines and are identified by four digit reference numerals, here beginning with the numerical prefix '16'.

As described previously, in accordance with the invention, performance monitoring capability for the downstream-directed, channel bank-to-customer portion of the metallic four wire pair is provided by the insertion of framing and error detection sequence signals into the DS0 data stream in the signal flow path to the DDST serving the customer's digital signalling equipment. Similarly, performance monitoring for the return or DDST-to-channel bank portion of the metallic four wire pair is provided by the insertion of framing and error detection sequence signals into the DS0 data stream in the signal flow path from the DDST.

For this purpose, bipolar signals from the tip and ring leads T and R of the receive portion 21R of the metallic four wire pair of the local loop 21 from the OCU-DP loop interface of FIG. 15 are applied via a coupling transformer 511 to a bipolar receiver 513. The output of bipolar receiver 513 is coupled through a second order low pass filter 515 to an equalizer 517, which provides amplitude and frequency compensation for the loop cable 21. The output of equalizer 517 is coupled to a bit slice circuit 521 which, as described above, compares the equalized signal with threshold levels, typically set at one-half the magnitude of the positive and negative peaks of the bipolar data stream, and outputs a dual polarity digital representation of the received data on complementary polarity links 523, 525. The received DS0 data stream is sampled in a synchronous sampling circuit 531, timing for which is provided by a timing recovery loop 533, and coupled over respective positive and negative polarity data links 541 and 543 to an AMI decoder 545.

In a conventional network termination, where there is no performance signalling, the received DS0 signal path is coupled directly to a DDST output port for application to a data service unit/channel service unit (CSU/DSU) located at the customer's premises. The incorporation of an AMI decoder is for the purpose detecting the presence of loopback command signals, and such a decoder is customarily coupled in a secondary, loopback control path to a downstream loopback relay circuit. In accordance with the present invention, however, received (composite) DS0 signals from the OCU-DP may contain performance monitoring information, which must be extracted and processed. As a consequence, in the modified DDST of the present invention, the AMI decoder 545 is coupled in the DS0 signal flow path and has an output link 547 which, in addition to being coupled to customary loopback control signal detect logic 551, as described above, is coupled to a demultiplexer 1605 and to a frame recovery unit 1607. Loopback control signal detect logic 551 is coupled to a sealing current polarity detector 552, which is coupled to coupling transformers 511 and 512 in the incoming and return tip/ring paths of loop 21, and has its output coupled to loopback relay interface 555.

Frame recovery unit 1607 extracts framing overhead information that has been inserted at the upstream OCU-DP loop interface of FIG. 15 and controls the throughput of demultiplexer 1605 to a respective one of output ports 1611, 1613 and 1615. Demultiplexer output port 1611 is coupled to one input of an error detection sequence comparator 1620, a second input of which is coupled to the output of an error detection sequence generator 1623, the algorithm for which corresponds to that employed by error detection sequence generator 1511 in the OCU-DP loop interface of FIG. 15, described above. The input to error detection sequence generator 1623 is coupled to signal output port 1615 of demultiplexer 1605. The compare result (CSCR) output of comparator 1620 is coupled to a microcontroller 1600 as a first performance representative input.

An additional performance measure is derived by way of a received supervisory message data (SMD), such as the above-mentioned supervisory request to report stored performance errors, which frame recovery unit 1607 steers to demultiplexer output port 1613. The SMD data is coupled over line 1614 to microcontroller 1600. In response to these performance representative signals, microcontroller 1600 encodes a performance reporting message and couples the encoded message data bits via link 1621 to a first input 1631 of a multiplexer 1630 in the DS0 return path.

The signal output port 1615 of demultiplexer 1605 is coupled to an AMI encoder 1633, which restores, the DS0 signal to its original format. The encoded signal is then filtered in lowpass filter 1635, coupled through a low pass filter 1637 and applied to a bipolar signal generator 561. The bipolar output leads of bipolar signal generator 561 are coupled via transformer 563 and loopback interface 555 to an outgoing tip and ring pair T, R of the transmit portion of the downstream link to a data service unit/channel service unit (DSU/CSU) located at the customer's premises.

In a conventional network termination (DDST), where there is no performance signalling, the return signal path from the customer equipment is coupled directly through the loopback interface to the return tip and ring pair of the DS0 link. In accordance with the present invention, however, in order to inject performance monitoring signals into the returned DS0 signalling path, it is necessary to format customer equipment-sourced bipolar signals, so that they may be processed, formatted and combined with the overhead data. For this purpose, the incoming bipolar signals from the loopback interface 555 are applied via a coupling transformer 1641 to a bipolar receiver 1643. The output of bipolar receiver 1643 is coupled to a bit slice circuit 1645 which outputs a dual polarity digital representation of the received data on complementary polarity links 1647, 1649. The data is sampled in a synchronous sampling circuit 1651, timing for which is provided by a timing recovery loop 1653, and coupled over respective positive and negative polarity data links 1655 and 1657 to an AMI decoder 1659.

The output of AMI decoder 1659 is coupled to a second input 1632 of a multiplexer 1630, a select input 1636 of which is controlled by a framing generator 1640, which is operative to format an outgoing DS0 data stream which contains microcontroller supplied message data on link 1621, the AMI decoded customer data and an error detection sequence produced by error detection sequence generator 1663. Framing pattern generator 1640 sequentially varies the throughput path of multiplexer 1630, so as to selectively assemble the data, and overhead/control information in the form of an error detection sequence and supervisory message bits into a composite DS0 message pattern. The error detection sequence is generated by error detection sequence generator 1663 in accordance with the bit contents of the customer's DS0 data stream and applied via link 1665 to a third port 1634 of multiplexer 1630. The output of multiplexer 1630 is encoded in AMI encoder 1671 and the encoded signal is coupled through lowpass filter 1673 and applied to a bipolar signal generator 1675. The output of bipolar signal generator 1675 is coupled via transformer 512 to the tip and ring pair of DS0 transmit path 21T of the metallic loop for transmission to the OCU-DP line interface of FIG. 15.

As will be appreciated from the foregoing description, the desire of telecommunications services providers to equip existing equipment with the ability to monitor the performance of a DS0 communications channel between a customer premises interface and a D4 channel bank is successfully addressed in accordance with the present invention by a modification of channel bank and DS0 link-terminating digital services communication device components, so as to provide an embedded performance monitoring and reporting mechanism that is transparent to digital services subscribers while, at the same time, being readily accessible a supervisory control site, thereby enabling the control site to perform prescribed network supervisory tasks with respect to one or more selected DS0 links, including monitoring the channel quality of each DS0 loop.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a telephone communication network having a channel bank installed at a first site, said channel bank containing a line interface unit and a channel unit coupled thereto by way of a first digital communication link over which first digital communication signals are conveyed, and a second communication link coupled between said channel unit and a customer premises site, said second communication link conveying second digital communication signals between said channel unit and a digital data services terminal at said customer premises site, a method of enabling the performance of said second digital communications link to be monitored by way of said channel bank comprising the steps of:

(a) at said channel unit, monitoring a performance aspect of said second communication link during the transmission of second digital communication signals over said second communication link between said customer premises site and said channel unit, without intrusion upon said transmission of second digital communication signals over said second communication link between said customer premises site and said channel unit; and (b) forwarding from said channel unit to said line interface unit, first digital communication signals which include first information signal components representative of a monitored performance aspect of said second communication link as monitored in step (a), and second information signal components representative of contents of said second digital communication signals.

2. A method according to claim 1, further including the step of:

(c) reporting to a performance monitoring recipient, by way of a reporting communications path that is coupled between said line interface unit and said performance monitoring recipient, third digital communication signals representative of said first information signal components representative of said monitored performance aspect of said second communication link.

3. A method according to claim 2, wherein said reporting communications path conveys digital communication signals at a transmission rate different from that of said second digital communication signals conveyed over said second communication link.

4. A method according to claim 3, wherein said reporting communications path conveys digital communication signals at a transmission rate of said first digital communication signals conveyed over said first digital communication link.

5. A method according to claim 1, wherein step (a) further comprises storing information representative of said monitored performance aspect of said second communication link.

6. A method according to claim 1, wherein said first digital communication link comprises a tri-stated digital communications link.

7. A method according to claim 6, wherein said line interface unit is operative to transmit a performance monitoring command message over said tri-stated communications link to said channel unit during a first portion of a clock signal associated with said first digital communication signals, and to receive said first information signal components representative of said monitored performance aspect of said second communication link during said first portion of said clock signal when said line interface unit is not otherwise transmitting said performance monitoring command message.

8. A method according to claim 6, wherein said line interface unit is operative to transmit first communication signals containing customer premises-directed information signals over said tri-stated communication link to said channel unit during a first portion of a clock signal associated with said first digital communication signals, and to receive said first communication signals containing customer premises-sourced information signals during a second portion of said clock signal.

9. A method according to claim 8, wherein said line interface unit is operative to transmit a performance monitoring command message over said tri-stated communications link to said channel unit during a third portion of said clock signal, and to receive said first information signal components representative of said monitored performance aspect of said second communication link during said third portion of said clock signal when said line interface unit is not otherwise transmitting said performance monitoring command message.

10. A method according to claim 9, wherein said first portion and said second portion of said clock signal are interleaved with said third portion of said clock signal.

11. A method according to claim 9, wherein said first digital communication signals comprise DS1 signals and said second digital communication signals comprise DS0 signals.

12. A method according to claim 1, wherein step (a) comprises transmitting prescribed performance monitoring signals in addition to said second digital communication signals transmitted over said second communication link between said customer premises site and said channel unit, and deriving a measure of said performance aspect of said second communication link based upon an analysis of said prescribed performance monitoring signals.

13. A method according to claim 12, wherein step (a) comprises inserting error detection signals into a serial stream of said second digital communication signals transmitted over said second communication link between said customer premises site and said channel unit, and deriving a measure of said performance aspect of said second communications link based upon an analysis of said error detection signals.

14. A method according to claim 12, wherein step (a) comprises
  (a1) inserting error detection signals into a serial stream of second digital communication signals transmitted over said second communication link from said channel unit to said customer premises site,
  (a2) at said customer premises site, deriving a measure of said performance aspect of said second communication link based upon an analysis of said error detection signals, and
  (a3) inserting performance information signals representative of said measure of said performance aspect of said second communication link into a serial stream of second digital communication signals transmitted over said second communication link from said customer premises site to said channel unit.

15. A method according to claim 12, wherein step (a) comprises
  (a1) inserting error detection signals into a serial stream of second digital communication signals transmitted over said second communication link from said customer premises site to said channel unit, and
  (a2) at said channel unit, deriving a measure of said performance aspect of said second communication link based upon an analysis of said error detection signals.

16. For use with a telephone communication network having a channel bank installed at a first site, said channel bank containing a line interface unit and a channel unit coupled thereto, and a communications link coupled between said channel unit and a customer premises site, said communications link conveying first digital communication signals between said channel unit and a digital data services terminal at said customer premises site, an arrangement for enabling the performance of said communications link to be monitored by way of said channel bank comprising:
  a performance monitoring device, installed in said channel unit, and being operative to monitor a performance aspect of said communications link during transmission of first digital communication signals over said communications link between said customer premises site and said channel unit, without intrusion upon transmission of said first digital communication signals over said communications link between said customer premises site and said channel unit; and
  a bidirectional communication path coupled between said channel unit and said line interface unit, and being operative to convey second digital communication signals which include first information signal components representative of a monitored performance aspect of said communications link, as monitored by said performance monitoring device, and second information signal components representative of contents of said first digital communications signals.

17. An arrangement according to claim 16, wherein said line interface unit includes a performance monitoring transmitter which is operative to report to a performance monitoring recipient, by way of a reporting communications path coupled between said line interface unit and said performance monitoring recipient, third digital communication signals representative of said first information signal components representative of said monitored performance aspect of said communications link.

18. An arrangement according to claim 17, wherein said reporting communications path conveys digital communication signals at transmission rate different from that of said first digital communication signals conveyed over said communication link.

19. An arrangement according to claim 18, wherein said reporting communications path conveys digital communication signals at a transmission rate of said second digital communication signals conveyed over said a bidirectional communication path.

20. An arrangement according to claim 16, wherein said performance monitoring device further comprises memory which stores information representative of said monitored performance aspect of said communications link.

21. An arrangement according to claim 16, wherein said bidirectional communication path comprises a tri-stated digital communications link.

22. An arrangement according to claim 21, wherein said line interface unit is operative to transmit a performance monitoring command message over said tri-stated digital communications link to said channel unit during a first portion of a clock signal associated with said second digital communication signals, and to receive said first information signal components representative of said monitored performance aspect of said communications link during said first portion of said clock signal when said line interface unit is not otherwise transmitting said performance monitoring command message.

23. An arrangement according to claim 21, wherein said line interface unit is operative to transmit customer premises-directed information signals over said tri-stated communications link to said channel unit during a first portion of a clock signal associated with said second digital communication signals, and to receive customer premises-sourced information signals during a second portion of said clock signal.

24. An arrangement according to claim 23, wherein said line interface unit is operative to transmit a performance monitoring command message over said tri-stated communications link to said channel unit during a third portion of said clock signal, and to receive said first information signal components representative of said monitored performance aspect of said communications link during said third portion of said clock signal when said line interface unit is not otherwise transmitting said performance monitoring command message.

25. An arrangement according to claim 23, wherein said first portion and said second portion of said clock signal are interleaved with said third portion of said clock signal.

26. An arrangement method according to claim 24, wherein said first digital communication signals comprise DS0 signals and said second digital communication signals comprise DS1 signals.

27. An arrangement according to claim 16, wherein said performance monitoring device is operative to transmit prescribed performance monitoring signals in addition to said first digital communication signals transmitted over said communications link between said customer premises site and said channel unit, and deriving a measure of said performance aspect of said communications link based upon an analysis of said prescribed performance monitoring signals.

28. An arrangement according to claim 27, wherein said performance monitoring device is operative to insert error detection signals into a serial stream of said first digital communication signals transmitted over said communications link between said customer premises site and said channel unit, and deriving a measure of said performance aspect of said communications link based upon an analysis of said error detection signals.

29. An arrangement according to claim 27, wherein said performance monitoring device is operative to insert error detection signals into a serial stream of first digital communication signals transmitted over said communications link from said channel unit to said customer premises site, and further including, at said customer premises site, a signal processor which is operative to derive a measure of said performance aspect of said communications link based upon an analysis of said error detection signals, and to insert performance information signals representative of said measure of said performance aspect of said communications link into a serial stream of first digital communication signals transmitted over said communications link from said customer premises site to said channel unit.

30. An arrangement according to claim 27, further including an error detection signal transmitter which is operative to insert error detection signals into a serial stream of first digital communication signals transmitted over said communications link from said customer premises site to said channel unit, and wherein said performance monitoring device is operative to derive a measure of said performance aspect of said communications link based upon an analysis of said error detection signals.

\* \* \* \* \*